(12) United States Patent
Tokunaga et al.

(10) Patent No.: US 6,218,006 B1
(45) Date of Patent: *Apr. 17, 2001

(54) PRESSURE-SENSITIVE ADHESIVE COMPOSITION AND PRESSURE-SENSITIVE ADHESIVE SHEETS MADE THEREFROM, AND SEALANTS, REINFORCING SHEETS AND PRESSURE-SENSITIVE ADHESIVE SHEETS FOR PRINTING PRODUCED THEREFROM

(75) Inventors: Yasuyuki Tokunaga; Masahiko Ando; Takeshi Yamanaka; Waka Hikosaka; Makoto Kojima; Shin-ichi Kouno; Hiroaki Mashiko; Hiroshi Wada; Hiroshi Yamamoto; Yoshikazu Soeda; Naoki Matsuoka; Katsuya Kume; Mitsuo Kuramoto, all of Osaka (JP)

(73) Assignee: Nitto Denko Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,449

(22) PCT Filed: Mar. 15, 1996

(86) PCT No.: PCT/JP96/00695

§ 371 Date: Sep. 15, 1997

§ 102(e) Date: Sep. 15, 1997

(87) PCT Pub. No.: WO96/28519

PCT Pub. Date: Sep. 19, 1996

(30) Foreign Application Priority Data

| Mar. 15, 1995 | (JP) | 7-084846 |
|---|---|---|
| Jul. 28, 1995 | (JP) | 7-212425 |
| Aug. 17, 1995 | (JP) | 7-233321 |
| Sep. 15, 1995 | (JP) | 7-262275 |
| Sep. 15, 1995 | (JP) | 7-262276 |
| Dec. 8, 1995 | (JP) | 7-319884 |
| Jan. 22, 1996 | (JP) | 8-007943 |
| Jan. 22, 1996 | (JP) | 8-007944 |
| Feb. 21, 1996 | (JP) | 8-033792 |
| Feb. 29, 1996 | (JP) | 8-042310 |
| Mar. 1, 1996 | (JP) | 8-044406 |

(51) Int. Cl.$^7$ ............................. B32B 27/30; C08G 63/02
(52) U.S. Cl. .................. 428/355 AC; 428/41.5; 428/355 R; 528/272
(58) Field of Search ............... 428/41.5, 355 R, 428/355 AC; 528/272

(56) References Cited

U.S. PATENT DOCUMENTS

| 5,229,207 | 7/1993 | Paquette et al. ............. 428/355 |
| 5,609,954 | * 3/1997 | Aizawa et al. ............. 428/317.5 |

FOREIGN PATENT DOCUMENTS

| 0 533 275 | 3/1993 | (EP) . |
| 2 250 804 | 6/1975 | (FR) . |
| 403243679 | * 10/1991 | (JP) ............ C09J/133/04 |
| 04342785 | * 11/1992 | (JP) ............ C09J/175/06 |

* cited by examiner

*Primary Examiner*—Blaine Copenheaver
*Assistant Examiner*—Ula C. Ruddock
(74) *Attorney, Agent, or Firm*—Sughrue, Mion, Zinn, Macpeak & Seas, PLLC

(57) ABSTRACT

A pressure-sensitive adhesive composition, wherein the storage elastic modulus [G'] at room temperature is at least $2 \times 10^6$ dyne/cm$^2$ and the adhesive strength at room temperature is 1 kg/20 mm width or higher. Preferably, a pressure-sensitive adhesive composition comprising a polymer having a polycarbonate structure having a repeating unit represented by the following formula

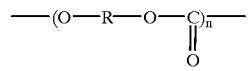

wherein R represents a straight chain or branched hydrocarbon group having from 2 to 20 carbon atoms, a pressure-sensitive adhesive sheet, a sealing material, a reinforcing sheet, and a pressure-sensitive sheet for printing, each having the pressure-sensitive adhesive composition.

7 Claims, No Drawings

PRESSURE-SENSITIVE ADHESIVE COMPOSITION AND PRESSURE-SENSITIVE ADHESIVE SHEETS MADE THEREFROM, AND SEALANTS, REINFORCING SHEETS AND PRESSURE-SENSITIVE ADHESIVE SHEETS FOR PRINTING PRODUCED THEREFROM

TECHNICAL FIELD

The present invention relates to a pressure-sensitive adhesive composition which is non-pressure-sensitive adhesive or low pressure-sensitive adhesive (tack free) at room temperature, pressure-sensitive adhesive sheets made up of the foregoing composition in the states of a sheet form, a tape form, etc., and a sealing material, a reinforcing sheet, and a pressure-sensitive adhesive sheet for printing using them.

BACKGROUND ART

A pressure-sensitive adhesive usually has a storage elastic modulus [G'] at room temperature of about $1 \times 10^6$ dyne/cm$^2$ or lower as described in D. Satas, Adhesive Age, 31(9), 28(1988). When the storage elastic modulus of a pressure-sensitive adhesive at room temperature is increased, the pressure-sensitive adhesive becomes too hard and becomes non-adhesive. This is because a micro-contact of the pressure-sensitive adhesive and the adherend is not sufficiently carried out in the adhesive step as in a wrapping film for foods, namely, the wrapping films are visually (optically) adhered to each other, but the adhesion is not exhibited.

However, because a conventional pressure-sensitive adhesive has a softness in a sticky state having a tackiness, the pressure-sensitive adhesive adheres quickly. But, it is not easy to peel the pressure-sensitive adhesive adhered by lightly contacting, and thus, the correction of the position is difficult. Also, in processing such as cutting, punching, etc., of a pressure-sensitive adhesive sheet, there is a problem that the processing edge is stained with the pressure-sensitive adhesive.

If the storage elastic modulus of the pressure-sensitive adhesive is increased to solve these problems, the adhesive property is lowered along with the tackiness as described above, and thus the adhesion to an adherend is difficult without an adhesive assisting means such as heat treatment.

As described above, a pressure-sensitive adhesive which has a high elasticity and non-pressure-sensitive adhesion or low pressure-sensitive adhesion (tack free) capable of preventing lowering of adhesive workability, etc., and also is excellent in the adhesion has not yet been found.

Under such circumstances, an object of the present invention is to provide a pressure-sensitive adhesive composition which shows an excellent adhesion while exhibiting a high elasticity and tack free at about room temperature, and hence can cope with the adhesive workability and the adhesion, and a pressure-sensitive adhesive sheet having the composition.

Also, other object of the present invention is to provide the above-described pressure-sensitive adhesive composition and pressure-sensitive adhesive sheets using the composition, which are excellent in the durability, the heat resistance, etc., and further to provide the above-described pressure-sensitive adhesive composition and pressure-sensitive adhesive sheets using the composition, which are also excellent in the self-adhesion in addition to the durability such as the heat resistance, weather resistance, etc.

Other object of the present invention is to provide the above-described pressure-sensitive adhesive composition and pressure-sensitive adhesive sheets using the composition, which show a good adhesion to various adherends and are excellent in the creep characteristics and the long-term durability and also is to provide the above-described pressure-sensitive adhesive composition and pressure-sensitive adhesive sheets using the composition, which satisfy the creep resistance and the adhesion in a high temperature range and are excellent in the shock resistance in a low-temperature range.

Furthermore, still other object of the present invention is to provide the above-described pressure-sensitive adhesive sheets using a release liner not subjected to a silicone release coating and thus suitable for computer instruments which are liable to cause problems by the existence of a silicone, and in particular to provide the above-described pressure-sensitive adhesive sheets which are excellent in the releasing property of the above-described liner and show a good adhesive strength.

Also, other object of the present invention is to provide pressure-sensitive adhesive sheets which can be wound in a roll form without using a release liner and are suitable for the uses such as computer instruments as pressure-sensitive adhesive sheets containing substantially no silicone compound.

DISCLOSURE OF THE INVENTION

The present inventors have discovered that by selecting a specific polymer for constituting a pressure-sensitive adhesive and crosslinking the polymer, a pressure-sensitive adhesive composition having specific values of the storage elastic modulus and the adhesive strength at room temperature can be obtained and the pressure-sensitive adhesive composition shows a good adhesion while having a high elasticity and being tack free, and also have discovered that a pressure-sensitive adhesive composition excellent in the self-adhesion in addition to the durability such as heat resistance and weather resistance can be obtained by specifying the solvent insoluble component of the polymer.

That is, the present invention provides a pressure-sensitive composition wherein the storage elastic modulus [G'] at room temperature is at least $2 \times 10^6$ dyne/cm$^2$ and the adhesive strength at room temperature is at least 1 kg/20 mm width, in particular, a pressure-sensitive composition comprising a polymer having a polycarbonate structure having a repeating unit represented by the following formula

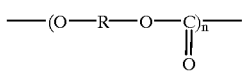

wherein R represents a straight chain or branched hydrocarbon group having from 2 to 20 carbon atoms, as the polymer for constituting the pressure-sensitive adhesive composition, and particularly, a pressure-sensitive adhesive composition comprising a polyester having a weight average molecular weight of at least 10,000 synthesized from diol components indispensably containing polycarbonate diol and dicarboxylic acid components indispensably containing a dicarboxylic acid having an aliphatic hydrocarbon group having from 2 to 20 carbon atoms or an alicyclic hydrocarbon group as the molecular structure. Also, according to the present invention, there is further provided a pressure-sensitive adhesive composition having the above-described construction, wherein the solvent insoluble component is from 1 to 30% by weight and the self-adhesive strength is at least 2.0 kg/20 mm width.

Also, the present inventors have discovered that by combining the polymer having the polycarbonate structure described above and a specific acrylic polymer, a pressure-sensitive adhesive composition showing good adhesion characteristics to various adherends and being excellent in the creep characteristics and the long-term durability can be obtained. That is, according to other aspect of the present invention, there is provided a pressure-sensitive adhesive composition comprising, along with the polymer having the polycarbonate structure, an acrylic polymer having a glass transition temperature of not higher than −10° C. in an amount of from 10 to 90% by weight of the sum total of the above-described polymer and the acrylic polymer.

Furthermore, the present inventors have discovered that by combining the polymer having the polycarbonate structure described above and a specific resin, a pressure-sensitive adhesive composition satisfying the creep resistance and the adhesion in a high-temperature range and being excellent in the shock resistance at a low temperature can be obtained. That is, according to still other aspect of the present invention, there is provided a pressure-sensitive adhesive composition comprising, along with the polymer having the polycarbonate structure, a resin having a softening point of at least 80° C. in an amount of from 10 to 50% by weight of the sum total of the above-described polymer and the resin.

Moreover, the present invention can further provide pressure-sensitive adhesive sheets having the above-described pressure-sensitive adhesive compositions of various constitutions formed into a sheet form, a tape form, etc., that is, pressure-sensitive adhesive sheets having a layer composed of each of the above-described pressure-sensitive adhesive compositions having the various constitutions. In such pressure-sensitive adhesive sheets, a release liner is generally stuck to the surface of the pressure-sensitive adhesive layer thereof. As the release liner, the present inventors have discovered that a release liner made up of a polyethylene film, a polypropylene film, etc., which is not subjected to a silicone release coating, can be used, that is, a pressure-sensitive adhesive sheet exhibiting excellent releasing property of the release liner and having good adhesive strength can be obtained because of the characteristics of the pressure-sensitive adhesive composition. Accordingly, it has been discovered that pressure-sensitive adhesive sheets suitable for computer instruments, etc., which are liable to cause problems by the presence of a silicone, can be provided.

That is, according to other aspect of the present invention, there are provided pressure-sensitive adhesive sheets each having the layer made up of each of the above-described pressure-sensitive adhesive compositions of various constitutions and having stuck to the surface of the pressure-sensitive adhesive layer a release liner which is not subjected to a silicone release coating and, in particular, there are provided the pressure-sensitive adhesive sheets wherein the above-described release liner, which is not subjected to a silicone release coating, is a polyolefinic film composed of polyethylene, polypropylene, an ethylene-propylene copolymer or a mixture thereof, or a film the surface of which is processed with the polyolefin as described above, and also the releasing strength of the release liner is 200 g/50 mm width or lower.

Also, the present inventors have discovered that in the case of forming each of the above-described pressure-sensitive adhesive compositions of various constitutions on one surface of a base material, when at least the back side of the base material is constituted with a polyolefin such as polyethylene, polypropylene, etc., a pressure-sensitive adhesive sheet, which has a good releasing property between the layer made up of the pressure-sensitive composition and the back surface of the base material and thus can be wound in a roll form without inserting a release liner, can be obtained. That is, because according to the pressure-sensitive adhesive sheets, they do not have release liners and it is unnecessary to apply a silicone release coating to the back surface of each base material of them, the pressure-sensitive adhesive sheets of the present invention can be used for computer instruments, etc., which cause a problem by the presence of silicone, as pressure-sensitive adhesive sheets substantially containing no silicone compound.

In the pressure-sensitive adhesive composition of the present invention, the storage elastic modulus [G'] at room temperature is $2\times10^6$ dyne/cm$^2$ or higher, preferably $3\times10^6$ dyne/cm$^2$ or higher, particularly preferably $5\times10^6$ or higher, and usually $5\times10^7$ dyne/cm$^2$ or lower, and the pressure-sensitive adhesive composition does not show a high tackiness as a pressure-sensitive adhesive and scarcely adhere in a short time of about a few seconds. Accordingly, if it is a short time after adhesion, the pressure-sensitive adhesive composition can be peeled once and then adhered again, and the stuck position can be corrected without injuring an adherend. Also, in cutting the pressure-sensitive adhesive sheet, the pressure-sensitive adhesive does not stick to the cutting edge and does not stain the edge, because the pressure-sensitive adhesive does not adhere in a short time.

Also, although the pressure-sensitive adhesive composition of the present invention has a high elasticity and is tack free as described above, the pressure-sensitive adhesive composition has an adhesive strength at room temperature of at least 1 kg/20 mm width, preferably at least 1.5 kg/20 mm width, and usually 10 kg/20 mm width or lower and is provided with the unique and useful characteristics of showing a high adhesive strength without need of complicated step such as a heat treatment. An excellent effect of satisfying both the adhesive workability and the adhesion, which is difficult in conventional pressure-sensitive adhesive compositions, can be obtained by the characteristics.

In such a pressure-sensitive adhesive composition, it is preferred that the storage elastic modulus [G'] at −30° C. is $3\times10^7$ dyne/cm$^2$ or lower, preferably $2\times10^7$ dyne/cm$^2$ or lower, and usually $5\times10^6$ dyne/cm$^2$ or higher, and in this case, the effect that the pressure-sensitive adhesive composition is excellent in the shock resistance at a low temperature can be obtained. Also, it is preferred that the storage elastic modulus [G'] at 80° C. is $1\times10^6$ dyne/cm$^2$ or higher, preferably $3\times10^6$ dyne/cm$^2$ or higher, and usually $5\times10^7$ dyne/cm$^2$ or lower, and in this case, the pressure-sensitive adhesive composition shows a high cohesive force at a temperature as high as 80° C. and excellent characteristics are obtained together with the adhesive strength and the holding power.

The pressure-sensitive adhesive composition of the present invention has no particular restriction on the composition, as long as the composition has the above-described storage elastic modulus [G'] and the above-described adhesive strength, but, preferably used is a composition which is obtained by adding a crosslinking agent such as a polycyanate compound, etc., to a polymer for constituting the pressure-sensitive adhesive and effecting a crosslinking treatment and has the storage elastic modulus [G'] and the adhesive strength specified above as a result of the selection of the polymer, the extent of the crosslinking treatment and the like. With respect to the polymer for constituting the pressure-sensitive adhesive, a polymer having the repeating unit represented by the following formula is preferred as the polymer having a polycarbonate structure;

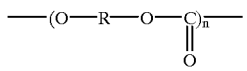

wherein R represents a straight chain or branched hydrocarbon group having from 2 to 20 carbon atoms.

The polymer includes a polyester synthesized from a polycarbonate diol (or the derivative thereof) and a dicarboxylic acid (or the derivative thereof), the polyester synthesized from a polycarbonate dicarboxylic acid and a diol, a polyurethane synthesized from a polycarbonate diol and a diisocyanate, etc., and in these polymers, the polyester synthesized from a polycarbonate diol and a dicarboxylic acid is preferred.

The polyester of this kind has a weight average molecular weight of at least 10,000, preferably at least 30,000, and particularly preferably at least 50,000 (usually not more than 300,000) synthesized from diol components indispensably containing a polycarbonate diol and dicarboxylic acid components indispensably containing a dicarboxylic acid having an aliphatic hydrocarbon having from 2 to 20 carbon atoms or an alicyclic hydrocarbon as the molecular structure.

The polycarbonate diol used in this case is a diol having the repeating unit represented by the following formula

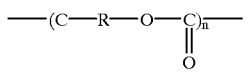

wherein R represents a straight chain or branched hydrocarbon group having from 2 to 20 carbon atom, and the number average molecular weight of the diol is at least 400, preferably at least 900 (usually not more than 10,000).

Such a polycarbonate diol includes polyhexamethylenecarbonate diol, poly(3-methylpentenecarbonate) diol, polypropylenecarbonate diol, etc., a mixture thereof, and a copolymer thereof. As commercially available products of the polycarbonate diol, there are "PLACCEL CD205PL", "PLACCEL CD208PL", "PLACCEL CD210PL", "PLACCEL CD220PL", "PLACCEL CD205", "PLACCEL CD208", "PLACCEL CD210", "PLACCEL CD220", "PLACCEL CD205HL", "PLACCEL CD208HL", "PLACCEL CD210HL", "PLACCEL CD220HL", etc., trade names, made by DAICEL CHEMICAL INDUSTRIES, LTD.

As the diol components, in addition to the above-described polycarbonate diol, if necessary, other components such as straight chain diol components and branched diol components (e.g., ethylene glycol, propylene glycol, butane diol, hexane diol, octane diol, decane diol, and octadecane diol) may be used in combination. It is preferred that the used amount of these other diol(s) is not more than 50% by weight, and preferably not more than 30% by weight to the total amount of the diol components. Also, a small amount of polyol component(s) of a three functional or higher may be added to increase the molecular weight of the polymer.

Also, the dicarboxylic acid component has an aliphatic hydrocarbon group having from 2 to 20 carbon atoms or an alicyclic hydrocarbon group and the aforesaid hydrocarbon group may be a straight chain one or a branched one. Specifically, there are succinic acid, methylsuccinic acid, adipic acid, pimelic acid, azelaic acid, sebacic acid, 1,12-dodecane diacid, 1,14-tetradecane diacid, tetrahydrophthalic acid, endomethylenetetrahydrophthalic acid, the acid anhydrides and the lower alkyl esters of these acids, etc.

As the dicarboxylic acid, it is preferred that the dicarboxylic acid having the aliphatic hydrocarbon group having from 2 to 20 carbon atoms or the alicyclic hydrocarbon group as the molecular structure is used singly but as the case may be a dicarboxylic acid having an aromatic hydrocarbon group as the molecular structure may be used together with the aforesaid dicarboxylic acid. It is better that the used amount of the dicarboxylic acid having the aromatic hydrocarbon group as the molecular structure is 50% by weight or lower, and particularly preferably an amount as small as 30% by weight or lower. Also, for the purpose of increasing the molecular weight of the polyester to be synthesized, a small amount of a tri-functional or higher functional carboxylic acid component can be added thereto.

The polyester is obtained by subjecting the diol component and the dicarboxylic acid component described above to an esterification reaction in the absence or presence of an appropriate catalyst according to an ordinary method. In this case, it is preferred that the diol component and the diarboxylic acid component are subjected to an equimolar reaction, but, the reaction may be carried out using either of them in an excessive amount in order to accelerate the esterification reaction. It is desirable that the polyester thus obtained has the above-described molecular weight. This is because if the molecular weight thereof is too low, the highly crosslinked pressure-sensitive adhesive has a high crosslinking density and thus has a very hard property, and contrary, the attempt of lowering the crosslinking density is undesirable in the heat resistance, etc., owing to the low molecular weight of the uncrosslinked components.

In the present invention, the pressure-sensitive adhesive composition, wherein the storage elastic modulus [G'] at room temperature and the adhesive strength become the above-described ranges, is formed by usually subjecting such a polymer having the polycarbonate structure, such as the polyester, to a crosslinking treatment by a proper means. In this case, the crosslinking means may be arbitrary, but a general method comprises using a poly-functional compound such as a polyisocyanate compound, an epoxy compound, an aziridine compound, a metal chelate compound, and a metal alkoxide compound as a crosslinking agent and crosslinking the polymer by reacting the polymer (the hydroxy group and the carboxyl group contained therein) and the poly-functional compound. As the poly-functional compound, a polyisocyanate compound is particularly preferred.

The polyisocyanate compound includes lower aliphatic polyisocyanates such as ethylene diisocyanate, butylene diisocyanate, hexamethylene diisocyanate, etc.; alicyclic polyisocyanates such as cyclopentylene diisocyanate, cyclohexylene diisocyanate, isophorone diisocyanate, etc.; aromatic polyisocyanate such as 2,4-tolylene diisocyanate, 4,4'-diphenylmethane diisocyanate, xylylene diisocyanate, etc.

As other polyisocyanate compound, the tolylene diisocyanate addition product of trimethylolpropane (Coronate L, trade name, made by Nippon Polyurethane Industry Co., Ltd.), the hexamethylene diisocyanate addition product of trimethylolpropane (Coronate HL, trade name, made by Nippon Polyurethane Industry Co., Ltd.), etc., are also used.

These polyfunctional compounds are used singly or as a mixture of two or more. The used amount thereof is properly selected according to the balance with the polymer to be crosslinked and the use application of the pressure-sensitive adhesive composition but in general, it is better to carry out the crosslinking treatment by compounding 0.5 part by weight or more, and preferably from about 1 to 5 parts by weight of the polyfunctional compound(s) per 100 parts by weight of the polymer having the polycarbonate structure. A pressure-sensitive adhesive composition in which the content of the solvent-insoluble component of the polymer is from 10 to 90% by weight, preferably from 15 to 80% by weight, and more preferably from 20 to 70% by weight can be obtained by the crosslinking treatment. If the content of the solvent-insoluble component of the polymer is too small, the insufficient cohesive force of the pressure-sensitive adhesive is exhibited and the sufficient modulus of elasticity, heat resistance, and durability can not be obtained.

As other crosslinking means, there is a method of compounding a polyfunctional monomer as a crosslinking agent with the polymer and crosslinking the polymer by electron rays, etc. The polyfunctional monomer includes ethylene glycol (meth)acrylate, pentaerithritol tri(meth)acrylate, tetramethylolmethane tetra(meth)acrylate, trimethylolpropane tri(meth)acrylate, etc. It is better that the used amount of the polyfunctional monomer is from 1 to 5 parts by weight, and preferably from 2 to 4 parts by weight per 100 parts of the above-described polymer such that the solvent-insoluble component of the polymer after crosslinking by electron rays, etc., is the value falling within the range described above.

The pressure-sensitive adhesive composition of the present invention is formed by using the above-described polymer having the polycarbonate structure as the base polymer and crosslinking the polymer usually by the means described above and the composition may be compounded with a conventionally known tackifier and also can arbitrarily contain various additives such as an inorganic or organic filler, a metal powder, a powder of a pigment, etc., a granular material, a foil-form material, an antioxidant, a plasticizer, etc.

The pressure-sensitive adhesive composition of the present invention shows a high adhesive strength while having a high modulus of elasticity and being tack free at room temperature, and further when the solvent-insoluble component is adjusted in the range of from 1 to 30% by weight, and preferably from 2 to 15% by weight by the crosslinking treatment of the polymer, the pressure-sensitive adhesive composition shows an excellent self-adhesion in addition to the durability such as the heat resistance, or the weather resistance. That is, the present invention can provide a pressure-sensitive adhesive composition having a self-adhesive strength of 2.0 kg/20 mm width or higher, and preferably from 2.5 to 10 kg/20 mm width. In this case, if the solvent-insoluble component of the polymer described above is less than 1% by weight, the pressure-sensitive adhesive composition is inferior in the durability such as the heat resistance, the weather resistance, etc., and if the solvent-insoluble component is more than 30% by weight, the high self-adhesive strength as described above is hard to be obtained.

In addition, hitherto, pressure-sensitive adhesives prepared by compounding a tackifier, a softening agent, etc., with a natural rubber, a synthetic rubber, etc., are known as a pressure-sensitive adhesive having a self-adhesion for bundling fresh vegetables or arranged flowers as disclosed in JP-A-54-96539 and JP-A-56-26968 (the term "JP-A" as used herein means an "unexamined published Japanese patent application"). However, because these pressure-sensitive adhesives are inferior in the weather resistance and the heat resistance, they have never been used for uses being used outdoors and used of requiring a reliability over a long period of time as industrial materials. Also, because these pressure-sensitive adhesives have a tackiness (pressure-sensitive adhesive property), there is a problem that the pressure-sensitive adhesive attaches to the hand and finger, articles, etc., before and after bounding. On the other hand, the pressure-sensitive adhesive composition of the present invention does not cause such a problem.

Furthermore, removing is difficult when removing after self-adhesion is required, and cutting of the pressure-sensitive adhesive tape is needed to release the bundling. In the cutting, there is a possibility of damaging the bundled article.

In the pressure-sensitive composition of the present invention, the polymer having the specific polycarbonate structure is contained as the main component and by crosslinking the polymer to a specific level, the pressure-sensitive adhesive composition does not substantially show a tackiness (i.e., show non-tackiness or slight tackiness at room temperature) but has an excellent self-adhesion and can be removed.

That is, the present invention provides a pressure-sensitive adhesive composition comprising, as the main component, a polymer having a polycarbonate structure having a repeating unit represented by the following formula

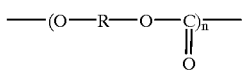

wherein R represents a straight chain or branched hydrocarbon group having from 2 to 20 carbon atoms, wherein the self-adhesive strength is at least 100 g/20 mm width and the adhesive strength is not higher than 2,000 g/20 mm width, and in particular, the above-described pressure-sensitive adhesive composition in which the aforesaid polymer is crosslinked and the solvent-insoluble component is from 60 to 95% by weight.

Furthermore, the present invention provides a pressure-sensitive adhesive sheet comprising a base material having on one surface or both surfaces thereof the layer made up of the above-described pressure-sensitive adhesive composition.

In the present invention, a pressure-sensitive adhesive composition which does not substantially show a tackiness (i.e., show non-tackiness or slight tackiness at room temperature), but has a good self-adhesion and is excellent in the removability is obtained by crosslinking such a polymer having the polycarbonate structure, such as a polyester, to a specific level. In this case, the extent of crosslinking is preferably such that the solvent-insoluble component is in the range of from 60 to 95% by weight, and more preferably from 65 to 90% by weight. If the solvent-insoluble component is less than 60% by weight, a sufficient removability is not obtained and if the solvent-insoluble component is more than 95% by weight, the self-adhesive strength is lowered. Thus, both cases are undesirable.

In the crosslinking method, the crosslinking agent is the same as described above and these crosslinking agents can be used singly or as a mixture of two or more. The used amount thereof is properly selected according to the balance with the polymer to be crosslinked. In general, it is better that the ratio of the above-described crosslinking agent becomes from about 2 to 10 parts by weight to 100 parts by weight of the polymer. The use of the crosslinking agent in such a ratio enables a pressure-sensitive adhesive composition having a solvent-insoluble component falling within the above-described range.

As other crosslinking agent, a method of adding the polyfunctional monomer as described above to the polymer as a substantial crosslinking agent and crosslinking the polymer by electron beam, etc., may be employed. The used amount of the polyfunctional monomer is properly selected according to the balance with the polymer to be crosslinked and further the use application of the pressure-sensitive adhesive composition. In general, it is better that the ratio of the polyfunctional monomer is at least 3 part by weight (usually up to about 10 parts by weight) to 100 parts by weight of the polymer, and by using the polyfunctional monomer in such a proportion, the pressure-sensitive adhesive composition having a solvent-insoluble component falling within the above-described range can be obtained.

The pressure-sensitive adhesive composition of the present invention is prepared by subjecting the above-described polymer to the crosslinking treatment as described above and has a self-adhesive strength and a removability such that the self-adhesive strength is 100 g/20 mm width or higher, preferably 150 g/20 mm width or higher, and more preferably 200 g/20 mm width or higher (usually up to 1,500 g/20 mm width) and the adhesive strength is 2,000 g/20 mm width or lower, preferably 1,800 g/20 mm width or lower, and more preferably 1,500 g/20 mm width or lower (usually up to 100 g/20 mm width).

If the self-adhesive strength is less than 100 g/20 mm width, the reliability of the unity or adhere of articles is inferior and if the adhesive strength is higher than 2000 g/20 mm width, the removing is difficult.

The term "self-adhesive strength" in the specification indicates the releasing strength at the initial stage after the pressure-sensitive adhesive surfaces are stuck to each other, and on the other hand, the term "adhesive strength" indicates the above-described releasing strength (self-adhesive strength) after allowing to stand for one day as in the working examples described later.

Also, in the present invention, by, along with the polymer having the polycarbonate structure, using an acrylic polymer having a glass transition temperature of −10° C. or lower in a ratio of from 10 to 90% by weight, and preferably from 15 to 85% by weight based on the sum total of the acrylic polymer and the above-described polymer, a pressure-sensitive adhesive composition showing good adhesive property to various adherends in addition to the above-described characteristics and being excellent in the creep characteristics and the long-term durability can be obtained.

Hitherto, an acrylic pressure-sensitive adhesive not containing a tackifier is poor in the adhesive property to plastics, while an acrylic or natural rubber series pressure-sensitive adhesive containing a tackifier has relatively good adhesive property to plastics, but has a problem in the creep characteristics and the long-term durability. On the other hand, in the pressure-sensitive adhesive composition of the present invention, such problems are avoided, and a pressure-sensitive adhesive excellent in the adhesive property to various adherends, in particular, plastics such as polycarbonate, acrylic resins, etc., and also excellent in the creep characteristics and the long-term durability can be provided.

The acrylic polymer to be used herein is a polymer made from monomers containing from 50 to 100% by weight of a (meth)acrylate having an alkyl group having from 4 to 14 carbon atoms, and the acrylic polymer having a glass transition temperature of −10° C. or lower, and particularly −15° C. or lower (usually up to about −90° C.) is preferably used. If the glass transition point is higher than −10° C., the pressure-sensitive adhesive composition is undesirably inferior in the initial adhesive strength.

The (meth)acrylate having an alkyl group having from 4 to 14 carbon atoms includes the alkyl esters of (meth)acrylic acid having an alkyl group such as butyl, isobutyl, isoamyl, hexyl, heptyl, 2-ethylhexyl, iso-octyl, iso-nonyl, lauryl, or iso-myristyl.

In the case of using such an acrylic polymer in combination, it is general to separately synthesizing the acrylic polymer and the polymer having the polycarbonate structure, and then mixing both the polymers at a solution state or bulky state to prepare a pressure-sensitive adhesive composition. However, as the case may be, the pressure-sensitive adhesive composition may be prepared by a method of effecting polymerization for the preparation of one polymer in another polymer or a method of simultaneously effecting polymerization for both polymers.

In these preparation methods, the used amount of the above-described acrylic polymer is such that the proportion of the acrylic polymer based on the sum total of the acrylic polymer and the polymer having the polycarbonate structure falls within the range described above. If the content of the acrylic polymer is less than 10% by weight, the initial adhesive property is lowered. On the other hand, if the content is more than 90% by weight, the adhesive property to plastics is lowered. Also, one or both of the aforesaid acrylic polymer and the polymer having the polycarbonate structure are subjected to the crosslinking treatment by the method described above and in this case, it is better that the solvent-insoluble component in the whole polymers falls within the range of from 10 to 90% by weight, preferably from 15 to 85% by weight, and more preferably from 20 to 80% by weight. If the content of the solvent-insoluble components is low, the creep characteristics and the long-term durability are inferior, while if the content is too high, the initial adhesive property is inferior. Thus, both cases are undesirable.

Furthermore, in the present invention, by using a resin having a softening of at least 80° C., together with the polymer having the polycarbonate structure, in a ratio of from 10 to 50% by weight, preferably from 13 to 45% by weight, and more preferably from 15 to 35% by weight of the sum total of the resin and the polymer, a pressure-sensitive adhesive composition satisfying the creep resistance and the adhesive property in a high-temperature range in addition to the above-described characteristics and also being excellent in the shock resistance at a low temperature can be obtained.

Hitherto, a pressure-sensitive adhesive composition containing added therein a heat-melting resin is known as described in JP-B-56-13040 (the term "JP-B" as used herein means an "examined published Japanese patent application"). The pressure-sensitive adhesive composition has advantages that the treatment work is simple and a heat resistance is not required for an adherend as compared with a heat-curing type requiring a heat treatment of 100° C. or higher but on the other hand, there is a problem in obtaining the creep resistance and the adhesive property in a high-temperature range.

Also, in JP-B-2-50146, a product obtained by adding a heat-melting resin in an acrylic graft polymer having a polymer of a high glass transition temperature at the side chain thereof is disclosed. The product satisfies the creep resistance and the adhesive property at a high-temperature range, but has a problem that it has poor shock resistance at a low temperature.

On the other hand, the pressure-sensitive adhesive composition of the present invention described above does not have such a problem, and a heat pressure-sensitive adhesive composition satisfying the creep resistance and the adhesive property at a high-temperature range and being excellent in the shock resistance at a low temperature can be provided.

The resin used in this case of the present invention has a softening point of 80° C. or higher, preferably 90° C. or higher, and more preferably 100° C. or higher and usually not higher than 150° C. The softening point of lower than 80° C. is undesirable, since the creep resistance and the adhesive strength at a high temperature are lowered.

As the kind of the resin, there are a terpene series resin, a rosin series resin, an alkylphenol series resin, a terpene phenol series resin, a rosin phenol series resin, a coumarone-indene series resin, an aromatic petroleum series resin, an aliphatic petroleum series resin, etc.

If the ratio of the resin of this kind is less than 10% by weight of the sum total of the resin and the polymer having the polycarbonate structure, the shock resistance at a low temperature is inferior.

Also, it is better that the solvent-insoluble component of the polymer containing the resin after the crosslinking treatment is in the range of from 10 to 90% by weight, preferably from 15 to 85% by weight, and more preferably from 20 to 80% by weight. If the content of the solvent-insoluble component is too low, the durability is inferior and if the content is too high, the adhesive property is inferior. Thus, both cases are not desirable.

The pressure-sensitive adhesive sheets of the present invention are a sheet-form or tape-form formed by the pressure-sensitive adhesive compositions of the various constitutions described above. That is, the pressure-sensitive adhesive sheets have at least a layer composed of the pressure-sensitive adhesive composition described above. The pressure-sensitive adhesive sheets include a so-called base material-less double faced pressure-sensitive adhesive sheet formed by firstly coating the layer of the above-described pressure-sensitive adhesive composition on a release liner so as to provide a dry thickness of usually about from 10 to 150 μm and, if necessary, sticking a release liner to the surface of the layer. In this case, in order to improve the adhesive characteristics, a multilayer structure may be formed utilizing other pressure-sensitive adhesive compositions.

Also, as the more general pressure-sensitive adhesive sheet, a base material-attached single faced or double faced pressure-sensitive adhesive sheet can be formed by using a base material composed of a plastic film such as a polyester film, etc.; a porous material such as a paper, a non-woven fabric, etc.; a metal foil, etc., coating the layer composed of the above-described pressure-sensitive adhesive composition on one surface or both surfaces of the base material at a dry thickness of usually from about 10 to 150 μm per one surface such that the base material carries the pressure-sensitive adhesive layer, and sticking a release liner on the surface(s) of the pressure-sensitive adhesive layer(s). In this case, to improve the adhesive characteristics, a multilayer structure may be employed by utilizing other pressure-sensitive adhesive composition.

In addition, in the base material-attached pressure-sensitive adhesive sheets and the above-described base material-less double faced pressure-sensitive adhesive sheets, the crosslinking treatment to the polymer having the polycarbonate structure, etc., can be properly applied during the production step of the above-described pressure-sensitive adhesive sheets or after the production step.

In the present invention, as the release liner to be stuck to the pressure-sensitive adhesive layer surface, a release liner made up of a polyethylene film, a polypropylene film, etc., which is not subjected to a silicone release coating, can be used. That is, even when such a release liner is used, a very good releasing property such that the releasing strength of the liner is 200 g/50 mm width or lower, preferably 100 g/50 mm width or lower, and more preferably 50 g/50 mm width or lower (usually up to 1 g/50 mm width) can be obtained, and further the good adhesive strength described above can be maintained.

In conventional acrylic series or rubber series pressure-sensitive adhesives, when a polyethylene film or a polypropylene film is used as a release liner, the releasing strength is 500 g/50 mm width or higher to lower the releasing workability, whereby it is inevitable to use a silicone-treated release liner. In the present invention, using a release liner which is not subjected to a silicone release coating, the releasing strength thereof can be set to 200 g/50 mm width or lower, and the above-described liner can be easily removed and the pressure-sensitive adhesive sheets of the present invention can be handled in the same manner as the use of ordinary pressure-sensitive adhesive tapes having silicone-treated release liners. For this reason, the change of the apparatus, the working process, etc., accompanied by the change of the silicone-treated release liner to the above-described release liner is unnecessary.

As described above, in the pressure-sensitive adhesive sheets of the present invention, by using a polyethylene film, a polypropylene film, etc., as the release liner, the production of the pressure-sensitive adhesive sheets containing no silicone is possible and as the result thereof, the pressure-sensitive adhesive sheets suitable for computer instruments which are liable to cause a problem by the presence of a silicone can be provided. Furthermore, when the release liner is made up of a simple film material such as polyethylene or polypropylene, the effect of providing excellent recycling property of plastics, which is regarded as a problem remarkably in these days, can be obtained.

The release liner not subjected to a silicone release coating, which can be used in the present invention, includes polyolefin series films made up of polyethylene, polypropylene, an ethylene-propylene copolymer (block or random copolymer), or a mixture of them or films the surface of which is processed with the above-described polyolefins, that is, polyethylene, polypropylene, an ethylene-propylene copolymer (block or random copolymer) or a mixture of them. The film the surface of which is processed with the polyolefin described above includes, for example, a laminate of the above-described polyolefin series film and papers or other films.

In the present invention, as the pressure-sensitive adhesive sheet not using such a release liner, a pressure-sensitive adhesive sheet comprising a base material having formed on one surface thereof the layer being composed of the above-described pressure-sensitive adhesive composition and having the thickness described above and having at least the back side thereof constituted with a polyolefin such as polyethylene, polypropylene, an ethylene-propylene copolymer (block or random copolymer) or a mixture thereof can be also obtained.

The feature of the pressure-sensitive adhesive sheets of this kind is that the back side of the base material is not subjected to a silicone release coating, but the releasing property between the layer composed of the pressure-sensitive adhesive composition and the back surface of the base material is good, and thus, the pressure-sensitive adhesive sheet can be wound in a roll form without inserting a release liner. As described above, because the pressure-sensitive adhesive sheet does not have a release liner and it is unnecessary to apply a releasing coating with a silicone compound to the back surface of the base material, the pressure-sensitive adhesive sheet of the present invention can be advantageously used for computer instruments as a pressure-sensitive adhesive sheet substantially containing no silicone compound. In addition, if the anchoring property of the layer composed of the pressure-sensitive adhesive composition and the base material is ensured, not only the back side of the base material but also the whole base material may be constituted with the polyolefin described above.

Second, the present invention provides a sealing material comprising a sealing base material having formed thereon the layer of the pressure-sensitive adhesive composition, which is used as an adhesive seal for constituting parts in electron instruments particularly avoiding a siloxane gas, such as mainly a hard disc drive (hereinafter referred to as HDD), a personal computer, a word processor, personal digital assistance (portable information instrument for person; hereinafter referred to as PDA), a portable telephone, etc.

The constituting parts in HDD, a personal computer, a word processor, PDA, a portable telephone, etc., are various and as one of the connecting means of these parts, a method of using a pressure-sensitive adhesive-processed product such as a pressure-sensitive adhesive tape is known. In particular, in the housing constructing step of HDD, to secure the airtightness, a pressure-sensitive adhesive-processed sealing material, that is, a sealing material (packing material) prepared by forming a layer of a pressure-sensitive adhesive composition on a foamed base material or a base material having a moisture-proofing effect is used. For the pressure-sensitive adhesive composition of the sealing material of this kind, it is desired to show a high adhesive property and cohesive property, and recently, performance such as a low volatile property is also required.

Now, in such a pressure-sensitive adhesive-processed sealing material, a release liner is usually stuck to the surface of the pressure-sensitive adhesive layer to protect the surface of the pressure-sensitive adhesive layer and to improve the handling property at storage and at use. Also, as the case may be, the back surface of the sealing base material composed of a foamed base material or a base material having a moisture-proof effect is subjected to a releasing coating to improve the releasing property between the surface of the pressure-sensitive adhesive layer and the back surface of the base material, whereby the sealing material is wound in a roll form without inserting a release liner.

On the other hand, the conventional sealing materials are designed such that a good adhesive property is secured, i.e., almost all sealing materials have a release liner subjected to a silicone release coating which has a low adhesive property or the back surface is subjected to a silicone release coating to improve releasing property with the back surface thereof. This causes the following problem.

That is, in the sealing materials of this kind, a phenomenon that a part of a silicone compound existing in the release liner or at the back side of the sealing base material transfers to the surface of the layer of the pressure-sensitive adhesive composition occurs. The phenomenon is almost insignificant in the case of a usual sealing material, but in the case where the sealing material is used in the state of being closed in the inside of HDD, etc., it becomes the cause of generating a siloxane gas, which results in causing the corrosion of the inside of HDD and causing erroneous actions.

Under such circumstances, other object of the present invention is to provide a sealing material being excellent in the releasing property from a release liner or the back surface of the base material, showing a good adhesive strength, and having a high sealing effect by using a release liner which is not subjected to a silicone release coating and a sealing base material the back surface of which is not subjected to a silicone release coating.

As the result of various investigations, the present inventors have found that by providing the pressure-sensitive adhesive composition comprising the specific polymer having the polycarbonate structure on a sealing base material, a release liner (for example, composed of a polyethylene film) which is not subjected to a silicone release coating and a sealing base material having a back side (for example, one constituted with polyethylene) which is not subjected to a silicone release coating can be used, and a sealing material having excellent releasing property with the release liner or the back surface of the base material, showing a good adhesive property, and having a high sealing effect as the desired object can be obtained, and the problems of causing the corrosion of the inside, etc., of HDD and the erroneous actions by the generation of a siloxane gas are avoided by the sealing material, and have accomplished the present invention.

That is, according to still other aspect of the present invention, there is provided a sealing material comprising a sealing base material composed of a foamed base material or a base material having a moisture proof effect having thereon a layer composed of a pressure-sensitive adhesive composition comprising a polymer of a polycarbonate structure having a repeating unit represented by the following formula as described above;

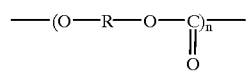

wherein R represents a straight chain or branched hydrocarbon group having from 2 to 20 carbon atoms.

In particular, the present invention provides a sealing base material wherein a release liner, which is not subjected to a silicone release coating, is stuck to the surface of the pressure-sensitive adhesive layer or the back side thereof is not subjected to a silicone release coating, and the sealing material is wound in a roll form without inserting a release liner and mainly provides the above-described sealing material as a connecting material for HDD, etc.

As the sealing base material to be used in this invention, known various materials can be used as long as the materials are provided with the sealing function as the desired purpose and do not substantially contain a silicone compound in the components of the materials. The typical sealing material is a sheet-form material or a foamed material of a synthetic resin or a synthetic rubber, such as polyurethane, a styrene-butadiene copolymer rubber (hereinafter referred to as SBR) or a material having an elastic effect made up of the laminate of these synthetic resin films. The thickness of the sealing material differs according to the form of the material, i.e., whether the material is a sheet-form material, a foamed material, or a laminate, but is generally from about 0.3 to 2.0 mm.

Another sealing material is a metal foil such as an aluminum foil, a fluorine resin film or a material having a moisture proof effect made up of a composite material obtained by forming a metal layer such as aluminum, etc., on a synthetic resin film such as a polyester film, etc., (laminating the metal foil or vapor depositing the metal on the synthetic resin film) or a composite material obtained by coating a fluorine resin layer on the synthetic resin film as described above. The thickness of the sealing material largely differs depending on whether the material is the metal foil, the fluorine resin film, or the laminate, but is preferably from about 10 to 200 μm.

In addition, the fluorine resin constituting the fluorine resin film and the fluorine resin layer includes polytetrafluoroethylene (PTFE), a tetrafluoroethylene-perfluoroalkyl vinyl ether copolymer (PFA), a tetrafluoroethylene-hexafluoroporpylene copolymer (FEP), an ethylene-tetrafluoroethylene copolymer (E/TFE), polyvinylidene fluoride (PVDF), polychlorotrifluoroethylene (PCTFE), an ethylene-chlorotrifluoroethylene copolymer (E/CTFE), a tetrafluoroethylene-perfluorodimethyldioxol copolymer (TEF/PDD), polyvinyl fluoride (PVF), etc.

The sealing material of the present invention is prepared by coating the layer composed of the above-described pressure-sensitive adhesive composition on the sealing base material as described above such that the layer has a dry thickness of usually from about 10 to 150 μm. The layer of the pressure-sensitive adhesive composition may be formed on one surface of the base material but, if necessary, may be formed on both surfaces thereof. Also, for improving the adhesive characteristics, a multilayer structure may be employed using other pressure-sensitive adhesive composition.

In such a sealing material, a release liner, which is not subjected to a silicone release coating, is usually stuck to the surface of the pressure-sensitive adhesive surface, that is, the surface of the layer composed of the pressure-sensitive adhesive composition. The release liner includes a polyolefin series film made up of polyethylene, polypropylene, an ethylene-propylene copolymer (block or random copolymer) or a mixture thereof and a film processed with the foregoing polyolefin, i.e., polyethylene, polypropylene, an ethylene-propylene copolymer (block or random copolymer) or a mixture thereof and the latter film the surface of which is processed also includes a laminate of the above-described polyolefin series film and papers or other films. The thickness of the release liner which is not subjected to a silicone release coating is usually from about 20 to 200 μm.

The sealing material of the present invention thus constituted is excellent in the releasing property and shows a large adhesive strength such that the releasing strength of the release liner is 200 g/50 mm width or lower, preferably 100 g/50 mm width or lower, and more preferably 50 g/50 mm width or lower (usually up to 1 g/50 mm width) and the adhesive strength is 1 kg/20 mm width or higher and preferably 1.5 kg/20 mm width or higher (usually up to 10 kg/20 mm width).

As described above, the sealing material of the present invention contains no silicone by utilizing a polyethylene film, a polypropylene film, etc., as the release liner and thus is particularly useful as a connecting material for HDD, etc., causing a problem by the generation of a siloxane gas. Also, when the release liner is made up of a simple film material such as polyethylene, polypropylene, etc., the sealing material is also excellent in the recycling property of plastics, which is particularly regarded as a problem recently.

Also, when in general acrylic or rubber series pressure-sensitive adhesives, a polyethylene film, a polypropylene film, etc., is used as the release liner, the releasing strength becomes 500 g/50 mm width or higher, whereby the problem of lowering the releasing workability cannot be avoided. In the present invention, such a problem does not occur. That is, because the releasing strength of the release liner can be set to 200 g/50 mm width or lower in the sealing material of the present invention, the release liner can be easily removed from the sealing material and the sealing material of this invention can be handled as the case of an ordinary sealing material having a silicone-treated release liner. As a result thereof, the advantage is obtained that the change of the apparatus, the working process, etc., accompanied by the change of the silicone-treated release liner to the above-described release liner of the present invention, which is not subjected to a silicone release coating, is unnecessary.

In the present invention, as a so-called liner-less sealing material not using such a release liner, a sealing material can be obtained by forming the layer of the above-described pressure-sensitive adhesive composition on one side of a sealing base material and winding in a roll form without applying a silicone release coating to the back side of the sealing base material and without inserting a release liner. In particular, the back side of a sealing base material is constituted with a polyolefin such as polyethylene, polypropylene, an ethylene-propylene copolymer, or a mixture thereof, and the sealing material can be wound in a roll form without inserting a release liner to obtain a roll-form wound sealing material.

Though the sealing material does not have a release liner and the back side of the sealing base material is not subjected to a silicone release coating, the material has a moderate releasing property with the back surface of the base material and a releasing strength adjusted to the same value as the case of using the aforesaid release liner, and also can maintain the adhesive strength as the case described above. Accordingly, the sealing material of this invention can be used as a connecting material for HDD, etc., which is the same use as the case of using the above-described release liner not subjected to a silicone release coating, as a sealing material substantially containing no silicone compound.

The 3rd aspect of the present invention provides a reinforcing sheet comprising an insulating base material and an adhesive layer which is used for reinforcing the terminal portions of a tape electric wire.

Recently, with the propagation of OA equipments and the development of LAN, multicore cables called "tape electric wires" (or "flat cables") have been widely used. The tape electric wire of this kind has a structure that a definite number (not less than 2) of electrically conductive wires are disposed in an insulating layer in parallel to each other at an interval.

In the case of connecting the terminal of the tape electric wire, the insulating layer is removed at the terminal to expose the electrically conductive wires, and a reinforcing sheet is adhered to the exposed portions. As the reinforcing sheet, the sheets described, for example, in JU-A-61-93936 (the term "JU-A" as used herein means an "unexamined published Japanese utility model application"), JP-A-3-283312, JP-4-298980, JP-A-6-260249, and JP-A-6-260250 are known.

The reinforcing sheet has a structure that an adhesive layer, which is to be adhered to the insulating layer (polyester film) and the electrically conductive wires of the terminal portion of the tape electric wire, is formed on one surface of the insulating base material which becomes a reinforcing layer. Also, the adhesive layer is a structure of stripe coating, double coating, etc., by selecting an adhesive suitable for each adherend for strongly adhering to each of the insulating layer and the electrically conductive wires.

Furthermore, as the components for the adhesive, a thermoplastic copolymerized polyester resin, an epoxy group-containing ethylene copolymer, a vinyl aromatic hydrocarbon polymer, an acrylic acid ester series polymer, a rubbery material, an ethylenic polymer, etc., are recommended. However, in almost all cases, considering the balance characteristics of the adhesive property to the insulating layer (polyester film) and the electrically conductive wires of the tape electric wires, the adhesive property with the insulating base material (reinforcing layer), etc., the thermoplastic copolymerized polyester resin has been widely used.

However, in conventional reinforcing sheets using the thermoplastic copolymerized polyester resin as the adhesive layer, in almost all cases, the adhesive strength at a normal temperature atmosphere (10 to 50° C.) is insufficient or even when the adhesive strength at a normal temperature atmosphere is good, the adhesive strength at a low-temperature atmosphere (lower than 10° C., particularly lower than 0° C.) or at a high-temperature atmosphere (higher than 50° C. and not higher than 80° C.) is insufficient.

The present invention has been made under these circumstances and the object of the present invention is to provide a reinforcing sheet comprising an insulating base material and an adhesive layer for reinforcing the terminal portion of a tape electric wire, which is excellent in the adhesive property to the tape electric wires even under a low-temperature atmosphere.

As the result of various investigations of material construction of the adhesive layer formed on one surface of an insulating base material for attaining the above-described object, the present inventors have found that by using the above-described specific polyester as the base polymer and properly crosslinking the base polymer, a reinforcing sheet having a very excellent adhesive property with tape electric wires under the environment from normal temperature to a low temperate can be obtained and have accomplished the present invention.

That is, the present invention provides a reinforcing sheet for reinforcing the terminal portion of a tape electric wire having such a structure that electrically conductive wires are disposed in an insulating layer at an interval, comprising an insulating base material having formed on one surface thereof a pressure-sensitive adhesive layer comprising the above-described specific polyester, and in particular, the above-described reinforcing sheet wherein the above-described polyester is further subjected to a crosslinking treatment and the solvent-insoluble component of the pressure-sensitive adhesive layer is at least 15% by weight can be provided.

In the reinforcing sheet of the present invention, as the insulating base material, any material may be used as long as the material effectively functions as a reinforcing layer for the terminal portion of a tape electric wire and, for example, a plastic film such as a polyester film, etc., having a thickness of usually from about 50 to 350 μm or a porous material such as a paper, a non-woven fabric, etc., is used.

In the reinforcing sheet of the present invention, the thickness of the pressure-sensitive adhesive layer formed on one surface of the above-described insulating base material is usually from about 10 to 150 μm and as a pressure-sensitive adhesive composition showing a good adhesive property to the above-described base material and also to the insulating layer and the conductive wires constituting the tape electric wire, and in particular, showing a good adhesive strength under a low-temperature environment of not higher than about 0° C., the pressure-sensitive adhesive composition prepared using the above-described specific polyester as the base polymer is used.

The components constituting the specific polyester, the method of crosslinking the polyester, the crosslinking agent, etc., are the same as described above, and the used amount of the above-described polyfunctional compound as the crosslinking agent is properly selected according to the balance with the polyester to be crosslinked. In general, it is better to carry out the crosslinking treatment by combining the crosslinking agent in an amount of at least about 0.5 part by weight, and preferably from about 1 to 4 parts by weight per 100 parts by weight of the polyester, whereby the pressure-sensitive adhesive composition, in which the solvent-insoluble component is 15% by weight or more, and preferably 20% by weight or more (usually up to 70% by weight), can be obtained. If the solvent-insoluble component of the pressure-sensitive adhesive component is less than 15% by weight, the cohesive force is insufficient and a sufficient adhesive property can not be obtained.

The used amount of the above-described polyfunctional compound is properly selected according to the balance with the polyester to be crosslinked. In general, it is better to carry out the crosslinking treatment by compounding the polyfunctional compound in an amount of at least about 0.5 part by weight, and preferably from about 1 to 4 parts by weight per 100 parts by weight of the polyester, whereby the pressure-sensitive adhesive composition wherein the solvent-insoluble component is 15% by weight or more, and preferably 20% by weight or more (usually up to 70% by weight) can be obtained. If the solvent-insoluble component of the pressure-sensitive adhesive composition is less than 15% by weight, the cohesive force is insufficient and a sufficient adhesive property can not be obtained.

As other crosslinking means, there is a method of compounding the above-described polyfunctional monomer as a crosslinking agent with the polyester and crosslinking the polyester by electron rays, etc. It is better that the used amount of the polyfunctional monomer is at least about 1 part by weight, and preferably from about 2 to 4 parts by weight per 100 parts by weight of the polyester such that the solvent-insoluble component of the pressure-sensitive adhesive composition after crosslinked by electron rays falls within the above-described values.

In the reinforcing sheet of the present invention, the thickness of the pressure-sensitive adhesive layer formed on one surface of the above-described insulating base material is usually from about 10 to 150 μm, and as the pressure-sensitive adhesive composition showing a good adhesive property to the above-described base material and the insulating layer and the conductive wires constituting the tape electric wire and, in particular, showing a good adhesive property in the atmosphere from a low temperature atmosphere of lower than 10° C. to a normal temperature atmosphere of from 10 to 50° C. and in a high-temperature atmosphere of from higher than 50 to 80° C., the following specific pressure-sensitive adhesive composition is used.

The specific pressure-sensitive adhesive composition is preferably the composition comprising, along with the above-described polymer having the polycarbonate structure, a resin having a softening point of at least 80° C. in a ratio of from 10 to 50% by weight of the sum total of the polymer and the resin. The content of the resin is from 10 to 50% by weight, preferably from 13 to 45% by weight, and more preferably from 15 to 35% by weight. If the content of the resin is more than 50% by weight, the shock resistance at a low temperature is lowered and if the content is less than 10% by weight, the shear adhesive strength is lowered, and in both cases, it becomes difficult to show a good adhesive strength in a wide temperature range of from a low temperature to a high temperature.

It is better that the pressure-sensitive adhesive composition used in this case contains the polymer having the polycarbonate structure and the specific resin in the above-described ratios and the content of the solvent-insoluble component is set in the range of preferably from 10 to 90% by weight, more preferably from 15 to 85% by weight, and still more preferably from 20 to 80% by weight. If the content of the solvent insoluble component is too low, the durability is inferior and if the content is too high, the adhesive property is inferior. Thus, both cases are not preferred.

The pressure-sensitive adhesive composition may further contain additives usually used, for example, a crosslinking agent such as an epoxy compound, an isocyanate compound, etc.; a filler such as glass fibers, a metal powder, etc., a pigment, a coloring agent, and a plasticizer.

Reinforcing the terminal portion of a tape electric wire by the use of the reinforcing sheet of the present invention thus constituted can be carried out according to an ordinary method. For example, after removing an insulating layer at the terminal portion of a tape electric wire having a structure such that 2 or more electrically conductive wires are disposed in an insulating layer at an interval to thereby expose the conductive wires, the above-described reinforcing sheet of the present invention is adhered to the exposed portion by utilizing adhesive strength of the pressure-sensitive adhesive layer to reinforce the foregoing terminal portion.

The 4th aspect of the present invention is a pressure-sensitive adhesive sheet for printing.

That is, because a silicone thin film which prevents attaching of a viscous material is not formed on the back surface of the base material of the above-described pressure-sensitive adhesive sheet, by using an ink ribbon coated with an ink containing a plastic component (e.g., the resin same as or similar to the base material) having an adhesive property to the base material and a coloring agent (e.g. organic or inorganic, dyes or pigments), heat-transferring the ink of the ink ribbon onto the back surface of the base material by a heat-transfer printer generally known, the ink is adhered to the back surface by a physical means such as welding, melt-attaching, etc., whereby printing can be applied.

Accordingly, in such a printing use, the base material is preferably porous in the point of the close attaching property, and also when the base material has a hiding property, the print can be clearly recognized in the relation with contrast.

There is no particular restriction on the means of making porous and, for example, the porous base material can be obtained by imparting strain to the base material and also forming fine cracks by a stretching operation. Such a stretching operation simultaneously imparts a light scattering function to the base material, and the hiding property is therefore improved.

The hiding property can be also obtained by compounding a filler, etc., but the porous base material may be composed of plural layers such that the back side is constituted with a polyolefin layer and a layer between the polyolefin layer and a pressure-sensitive adhesive layer is constituted with an opaque material (e.g., a paper) as a support layer.

BEST MODES FOR CARRYING OUT THE INVENTION

The present invention is described more practically by the following examples below, wherein all parts are by weight. Also, the weight average molecular weight of each polymer is a polystyrene converted value by a gel permeation chromatography.

Example 1-1

In a four-neck separable flask equipped with a stirrer, a thermometer, and a water separator were placed 250 g (hydroxy group: 0.512 equivalent) of polycarbonate diol (PLACCEL CD210PL, trade name, made by DAICEL CHEMICAL INDUSTRIES, LTD.; hydroxy group value 115 KOH mg/g), 51.8 g (acid group: 0.512 equivalent) of sebacic acid, and 127 mg of dibutyltin oxide (DBTO) as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 24 hours, a polyester having a weight average molecular weight of 55,000 was obtained. After diluting the polyester with toluene to a solid component concentration of 40% by weight, 2 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The composition was coated on a polyethylene terephthalate film (hereinafter referred to as PET film) of 38 μm in thickness by an applicator, followed by drying at 130° C. for 5 minutes, to form a pressure-sensitive adhesive layer of 50 μm in thickness, and further the layer was subjected to aging in an atmosphere of 50° C. for 5 days as post cure to prepare a pressure-sensitive adhesive tape.

Also, by the same procedure as above, the pressure-sensitive adhesive layer of 50 μm in thickness was formed on a releasing paper for measuring the storage modulus of elasticity.

Example 1-2

In a four-neck separable flask equipped with a stirrer, a thermometer, and a water separator were placed 250 g (hydroxy group: 0.25 equivalent) of polycarbonate diol (PLACCEL CD220PL, trade name, made by DAICEL CHEMICAL INDUSTRIES, LTD.; hydroxy group value 56.1 KOH mg/g), 23.5 g (acid group: 0.25 equivalent) of azelaic acid, and 62 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 25 hours, a polyester having a weight average molecular weight of 78,000 was obtained.

After diluting the polyester with toluene to a solid component concentration of 40% by weight, 1.5 parts (solid components) of the tolylene diisocyanate addition product of trimethylolpropane (Coronate L, trade name, made by Nippon Polyurethane Industry Co., Ltd.) per 100 parts (solid component) of the polyester was added thereto as a crosslinking agent to provide a pressure-sensitive adhesive composition. The composition was coated on a PET film of 38 μm in thickness by an applicator, followed by drying at 130° C. for 5 minutes, to form a pressure-sensitive adhesive layer of 50 μm in thickness, and further the layer was subjected to aging in an atmosphere of 50° C. for 5 days as post cure to prepare a pressure-sensitive adhesive tape.

Also, by the same procedure as above, the pressure-sensitive adhesive layer of 50 μm in thickness was formed on a releasing paper for measuring the storage modulus of elasticity.

Example 1-3

By following the same procedure as Example 1-2 except that 2.5 parts (solid components) of the hexamethylene diisocyanate addition product of trimethylolpropane (Coronate HL, made by Nippon Polyurethane Industry Co., Ltd.) was added as the crosslinking agent in place of Coronate L, a pressure-sensitive adhesive tape was prepared. Also, by the same procedure as above, the pressure-sensitive adhesive layer of 50 μm in thickness was formed on a releasing paper for measuring the storage modulus of elasticity.

Example 1-4

In a four-neck separable flask equipped with a stirrer, a thermometer, and a water separator were placed 250 g (hydroxy group: 0.25 equivalent) of polycarbonate diol (PLACCEL CD220PL, trade name, made by DAICEL CHEMICAL INDUSTRIES, LTD.; hydroxy group value 56.1 KOH mg/g), 12.6 g of sebacic acid and 11.8 g (total acid groups: 0.25 equivalent) of azelaic acid, and 62 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 25 hours, a polyester having a weight average molecular weight of 75,000 was obtained.

After diluting the polyester with toluene to a solid component concentration of 40% by weight, 2 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The composition was coated on a PET film of 38 μm in thickness by an applicator, followed by drying at 130° C. for 5 minutes, to form a pressure-sensitive adhesive layer of 50 μm in thickness, and further the layer was subjected to aging in an atmosphere of 50° C. for 5 days as post cure to prepare a pressure-sensitive adhesive tape. Also, by the same procedure as above, the pressure-sensitive adhesive layer of 50 μm in thickness was formed on a releasing paper for measuring the storage modulus of elasticity.

Comparative Example 1-1

In a reaction vessel equipped with a stirrer and a thermometer were placed 95 parts of n-butyl acrylate, 5 parts of acrylic acid, 150 parts of toluene, and 0.1 part of azobisisobutyronitrile and then a solution polymerization was carried out at 60° C. for about 7 hours in a nitrogen gas atmosphere to provide a polymer solution. By adding 2 parts (solid components) of the tolylenene diisocyanate addition product of trimethylolpropane (Coronate L, trade name, made by Nippon Polyurethane Industry Co., Ltd.) per 100 parts (solid components) of the polymer was added thereto as a crosslinking agent to provide a pressure-sensitive adhesive composition. The pressure-sensitive adhesive composition was coated on a PET film of 38 μm in thickness by an applicator, followed by drying at 130° C. for 5 minutes, to form a pressure-sensitive adhesive layer of 50 μm in thickness and further the layer was subjected to aging in an atmosphere of 50° C. for 5 days as post cure to prepare a pressure-sensitive adhesive tape. Also, by the same procedure as above, the pressure-sensitive adhesive layer of 50 μm in thickness was formed on a releasing paper for measuring the storage modulus of elasticity.

Comparative Example 1-2

In a reaction vessel equipped with a stirrer and a thermometer were placed 80 parts of 2-ethylhexyl acrylate, 20 parts of acrylic acid, and 0.6 part of Irgacure 184 (trade name, made by Ciba-Geigy Corporation) as a photopolymerization initiator and after sufficiently replacing the inside atmosphere with a nitrogen gas, the mixture was irradiated with ultraviolet rays by a high-pressure mercury lamp at a dosage of about 100 mj/cm$^2$. The viscous material obtained by the irradiation was compounded with 1 part of trimethylolpropane triacrylate to provide a pressure-sensitive adhesive composition. The pressure-sensitive adhesive composition was coated on a PET film of 38 μm in thickness to provide a thickness of 50 μm.

Thereafter, to remove the polymerization hindrance with oxygen, the coated layer was covered by a PET releasing liner and irradiated with ultraviolet rays by a high-pressure mercury lamp at a dosage of about 1,400 mj/cm$^2$ to form a pressure-sensitive layer, whereby a pressure-sensitive adhesive tape was prepared. Also, by the same procedure as above, the pressure-sensitive adhesive layer of 50 μm in thickness was formed on a releasing paper for measuring the storage modulus of elasticity.

About each of the pressure-sensitive adhesive tapes obtained in Examples 1-1 to 1-4 and Comparative Examples 1-1 and 1-2, the storage elastic moduluses at −30° C., room temperature (23° C.), and 80° C. and the adhesive strength (180° release adhesion) at room temperate (23° C.) were determined by the following methods.

The obtained results are shown in Table 1-1 below.

Storage Elastic Modulus

The storage elastic modulus [G'] means a shear storage elastic modulus of a pressure-sensitive adhesive composition and said to be an elastic component storing an energy added from outside as a stain energy but the measurement of the storage elastic modulus [G'] was carried out by a system of measuring using a dynamic viscoelasticity measurement apparatus RDS-11 manufactured by Rheometrics, Inc. by a jig of parallel plate of a sample thickness of about 1.5 mm and a diameter of 7.9 mm at a frequency of 1 Hz.

Adhesive strength

The pressure-sensitive adhesive tape was stuck to an acryl plate (polymethyl methacrylate) as an adherend and 180° peel adhesive strength was measured under the condition of an atmospheric temperature of 23° C., a stuck time of 30 minutes, and a releasing rate of 300 mm/minute.

TABLE 1

|  | Storage Elastic Modulus [G'] (dyne/cm$^2$) | | | Adhesive Strength (kg/20 mm width) |
| --- | --- | --- | --- | --- |
|  | −30° C. | 23° C. | 80° C. |  |
| Ex 1-1 | $1.5 \times 10^7$ | $7.1 \times 10^6$ | $3.7 \times 10^6$ | 1.6 |
| Ex 1-2 | $1.6 \times 10^7$ | $9.6 \times 10^6$ | $5.1 \times 10^6$ | 2.1 |
| Ex 1-3 | $1.8 \times 10^7$ | $1.5 \times 10^7$ | $1.1 \times 10^7$ | 1.8 |
| Ex 1-4 | $1.8 \times 10^7$ | $1.2 \times 10^7$ | $9.1 \times 10^6$ | 2.0 |
| CE 1-1 | $5.2 \times 10^7$ | $1.1 \times 10^6$ | $3.4 \times 10^5$ | 1.3 |
| CE 1-2 | $1.9 \times 10^9$ | $2.6 \times 10^7$ | $7.9 \times 10^5$ | 0.4 |

Ex: Example
CE: Comparative Example

Then, about each of the pressure-sensitive adhesive tapes obtained in Examples 1-1 to 1-4 and Comparative Examples 1-1 and 1-2, the thumb tack at room temperature (23° C.) and the heat resistance (80° C.) were measured by the following methods. These results are shown in Table 1-2 below.

Thumb Tack

The surface of each pressure-sensitive adhesive tape was touched with the thumb at room temperature (23° C.), after pressing the thumb to the surface for a short time (about 1 second), the thumb was separated from the surface, and the thumb tack was evaluated by the resistance that the surface of the thumb felt.

Measurement of Heat Resistance

Each pressure-sensitive adhesive tape was stuck to a bakelite plate as an adherend, a load of 500 g/2 cm$^2$ was applied to the perpendicular direction at an atmospheric temperature of 80° C., and the retention time (minute) until the tape falls was measured.

TABLE 1-2

|  | Thumb Tack | Heat Resistance (retention time: minute) |
| --- | --- | --- |
| Example 1-1 | none | >120 |
| Example 1-2 | none | >120 |
| Example 1-3 | none | >120 |
| Example 1-4 | none | >120 |
| C. Example 1-1 | felt | >120 |
| C. Example 1-2 | none | >120 |

C. Example: Comparative Example

From the results shown in Table 1-1 and Table 1-2 above, it can seen that each of the pressure-sensitive adhesive tapes in Examples 1-1 to 1-4 of the present invention has not only high elasticity and tack free but also a large adhesive strength as compared with the pressure-sensitive adhesive tapes in Comparative Examples 1-1 and 1-2, and also is satisfactory in the heat resistance.

Example 2-1

In a four-neck separable flask equipped with a stirrer, a thermometer, and a water separator were placed 200 g (hydroxy group: 0.41 equivalent) of polycarbonate diol (PLACCEL CD210PL, trade name, made by DAICEL CHEMICAL INDUSTRIES, LTD.; hydroxy group value 115.0 KOH mg/g), 20.51 g (acid group: 0.41 equivalent) of succinic anhydride, and 102 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 27 hours, a polyester having a weight average molecular weight of 56,000 was obtained.

After diluting the polyester with toluene to a solid component concentration of 50% by weight, 1.5 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition.

The composition was coated on a PET film of 38 μm in thickness by an applicator, followed by drying at 130° C. for 5 minutes, to form a pressure-sensitive adhesive layer of 50 μm in thickness, and further the layer was subjected to aging in an atmosphere of 50° C. for 5 days as post cure to prepare a pressure-sensitive adhesive tape.

Example 2-2

In a four-neck separable flask equipped with a stirrer, a thermometer, and a water separator were placed 250 g (hydroxy group: 0.512 equivalent) of polycarbonate diol (PLACCEL CD210PL, trade name, made by DAICEL CHEMICAL INDUSTRIES, LTD.; hydroxy group value 115.0 KOH mg/g), 37.44 g (acid group: 0.512 equivalent) of adipic acid, and 127 mg of DBTO as a catalyst, 3the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 30 hours, a polyester having a weight average molecular weight of 58,000 was obtained.

After diluting the polyester with toluene to a solid component concentration of 50% by weight, 1.5 parts (solid components) of the tolylene diisocyanate addition product of trimethylolpropane (Coronate L, trade name, made by Nippon Polyurethane Industry Co., Ltd.) per 100 parts (solid component) of the polyester was added thereto as a crosslinking agent to provide a pressure-sensitive adhesive composition. The composition was coated on a PET film of 38 μm in thickness by an applicator, followed by drying at 130° C. for 5 minutes, to form a pressure-sensitive adhesive layer of 50 μm in thickness, and further the layer was subjected to aging in an atmosphere of 50° C. for 5 days as post cure to prepare a pressure-sensitive adhesive tape.

Example 2-3

In a four-neck separable flask equipped with a stirrer, a thermometer, and a water separator were placed 250 g (hydroxy group: 0.25 equivalent) of polycarbonate diol (PLACCEL CD220PL, trade name, made by DAICEL CHEMICAL INDUSTRIES, LTD.; hydroxy group value 56.1 KOH mg/g), 25.28 g (acid group: 0.25 equivalent) of sebacic acid, and 62 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 25 hours, a polyester having a weight average molecular weight of 72,000 was obtained.

After diluting the polyester with toluene to a solid component concentration of 50% by weight, 2 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The composition was coated on a PET film of 38 μm in thickness by an applicator, followed by drying at 130° C. for 5 minutes, to form a pressure-sensitive adhesive layer of 50 μm in thickness, and further the layer was subjected to aging in an atmosphere of 50° C. for 5 days as post cure to prepare a pressure-sensitive adhesive tape.

Example 2-4

After diluting the polyester obtained in Example 2-3 with toluene to a solid component concentration of 50% by weight, 3 parts (solid components) of trimethylolpropane triacrylate was added thereto per 100 parts (solid component) of the polyester as a crosslinking agent to provide a pressure-sensitive adhesive composition. The composition was coated on a PET film of 38 μm in thickness by an applicator, followed by drying at 100° C. for 5 minutes, to form a pressure-sensitive adhesive layer of 50 μm in thickness and further, the layer was irradiated by electron rays at 6 Mrad to prepare a pressure-sensitive adhesive tape.

With respect to each of the pressure-sensitive adhesive tapes obtained in Examples 2-1 to 2-4 described above, the solvent-insoluble component of the polyester, the adhesive strength, and the heat resistance were measured. These results are shown in Table 2-1 below. In addition, the solvent-insoluble component and the adhesive strength were measured by the methods described below and the heat resistance was measured by the method described above.

Measurement of Solvent-Insoluble Component

About 0.1 g of the pressure-sensitive adhesive was sampled from the pressure-sensitive adhesive tape and accurately weighed. After immersing the sample in about 50 ml of toluene for 5 days at room temperature, solvent-insoluble component was taken out, after drying at 130° C. for about one hour, the component was weighed. The solvent-insoluble component [X] (weight %) was calculated by the following equation.

$$X(\%) = (A\ (g)/B\ (g)) \times 100$$

A: The weight after immersion and drying
B: The weight of the sample

Measurement of Adhesive strength

The pressure-sensitive adhesive tape was stuck to a polycarbonate plate or an acryl plate (polymethyl acrylate) as an adherend and then the 180° C. peel adhesive strength was measured under the conditions of an atmospheric temperature of 23° C., a stuck time of 30 minutes and a releasing rate of 300 mm/minute.

TABLE 2-1

|  | Solvent-Insoluble Component (weight %) | Adhesive strength (kg/20 mm width) | | Retention Time (minute) |
| --- | --- | --- | --- | --- |
|  |  | Polycarbonate Plate | Acryl Plate |  |
| Ex 2-1 | 25 | 2.8 | 2.3 | ≧120 |
| Ex 2-2 | 33 | 3.0 | 2.5 | ≧120 |
| Ex 2-3 | 65 | 2.8 | 1.9 | ≧120 |
| Ex 2-4 | 41 | 2.2 | 1.8 | ≧120 |

Ex: Example

As is clear from the results shown in the above Table 2-1, it can be seen that each of the pressure-sensitive adhesive tapes having the pressure-sensitive adhesive compositions, respectively, in Examples 2-1 to 2-4 of the present invention has a good adhesive strength and is greatly excellent in the heat resistance.

Example 3-1

In a four-neck separable flask equipped with a stirrer, a thermometer, and a water separator were placed 200.0 g (hydroxy group: 0.41 equivalent) of polycarbonate diol (PLACCEL CD210PL, trade name, made by DAICEL CHEMICAL INDUSTRIES, LTD.,; hydroxy group value 115.0 KOH mg/g), 20.51 g (acid group: 0.410 equivalent) of succinic anhydride, and 102 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 30 hours, a polyester having a weight average molecular weight of 65,000 was obtained.

After diluting the polyester with toluene to a solid component concentration of 40% by weight, 2 parts (solid components) of diphenylmethane diisocyanate (Millionate MT, trade name, made by Nippon Polyurethane Industry Co., Ltd.) per 100 parts (solid components) of the polyester was added thereto as a crosslinking agent to provide a solution of a pressure-sensitive adhesive composition. The solution was coated on a PET film of 38 μm in thickness by an applicator, followed by drying at 130° C. for 5 minutes, to form a pressure-sensitive adhesive layer of 50 μm in thickness. Then, the layer was further subjected to aging in an atmosphere of 50° C. for 2 days as post cure to prepare a pressure-sensitive adhesive tape.

Example 3-2

In a four-neck separable flask equipped with a stirrer, a thermometer, and a water separator were placed 250.0 g (hydroxy group: 0.512 equivalent) of polycarbonate diol (PLACCEL CD210PL, trade name, made by DAICEL CHEMICAL INDUSTRIES, LTD.; hydroxy group value 115.0 KOH mg/g), 37.44 g (acid group: 0.512 equivalent) of adipic acid, and 127 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 35 hours, a polyester having a weight average molecular weight of 80,000 was obtained.

After diluting the polyester with toluene to a solid component concentration of 40% by weight, 1 part (solid components) of diphenylmethane diisocyanate and 0.5 part (solid components) of the hexamethylene diisocyanate addition product of trimethylolpropane (Coronate HL, trade name, made by Nippon Polyurethane Industry Co., Ltd.) per 100 parts (solid components) of the polyester were added thereto as crosslinking agents to provide a solution of a pressure-sensitive adhesive composition. The solution was coated on a PET film of 38 μm in thickness by an applicator, followed by drying at 130° C. for 5 minutes, to form a pressure-sensitive adhesive layer of 50 μm in thickness. Then, the layer was further subjected to aging in an atmosphere of 50° C. for 2 days as post cure to prepare a pressure-sensitive adhesive tape.

Example 3-3

In a four-neck separable flask equipped with a stirrer, a thermometer, and a water separator were placed 250.0 g (hydroxy group: 0.250 equivalent) of polycarbonate diol (PLACCEL CD220PL, trade name, made by DAICEL CHEMICAL INDUSTRIES, LTD.; hydroxy group value 56.1 KOH mg/g), 25.28 g (acid group: 0.250 equivalent) of sebacic acid, and 62 mg of DBTO as a catalyst, the temperature of the mixture was raised to 180° C. while stirring in the presence of a small amount of xylene as a reaction water discharging solvent, and the mixture was maintained at the temperature. After a while, the outflow and separation of water were observed and the reaction began to proceed. By continuing the reaction for about 30 hours, a polyester having a weight average molecular weight of 90,000 was obtained.

After diluting the polyester with toluene to a solid component concentration of 40% by weight, 0.8 part (solid components) of diphenylmethane diisocyanate and 0.2 part (solid components) of the hexamethylene diisocyanate addition product of trimethylolpropane (Coronate HL, trade name, made by Nippon Polyurethane Industry Co., Ltd.) per 100 parts (solid components) of the polyester were added thereto as crosslinking agents to provide a solution of a pressure-sensitive adhesive composition. The solution was coated on a PET film of 38 μm in thickness by an applicator, followed by drying at 130° C. for 5 minutes, to form a pressure-sensitive adhesive layer of 50 μm in thickness. Then, the layer was further subjected to aging in an atmosphere of 50° C. for 2 days as post cure to prepare a pressure-sensitive adhesive tape.

Example 3-4

To 100 parts (solid components) of the polyester obtained in Example 3-3 was added 3 parts of 1,6-hexanediol diacrylate as a substantial crosslinking agent to provide a solution of a pressure-sensitive adhesive composition. The solution was coated on a PET film of 38 μm in thickness by an applicator, followed by-drying at 100° C. for 5 minutes, to form a pressure-sensitive adhesive layer of 50 μm in thickness. The layer was further irradiated by electron rays at 3 Mrad to prepare a pressure-sensitive adhesive tape.

Reference Example 3-1

To 100 parts (solid components) of the polyester obtained in Example 3-3 was added 2 parts (solid components) of the hexamethylene diisocyanate addition product of trimethylolpropane (Coronate HL, trade name, made by Nippon Polyurethane Industry Co., Ltd.) as a substantial crosslinking agent to provide a solution of a pressure-sensitive adhesive composition. The solution of the pressure-sensitive adhesive composition was coated on a PET film of 38 μm in thickness by an applicator, followed by drying at 130° C. for 5 minutes, to form a pressure-sensitive adhesive layer of 50 μm in thickness. Furthermore, the layer was subjected to aging in an atmosphere of 50° C. for 2 days to prepare a pressure-sensitive adhesive tape.

Comparative Example 3-1

The polyester solution obtained in Example 3—3 was coated on a PET film of 38 μm in thickness by an applicator, followed by drying at 130° C. for 5 minutes, to form a pressure-sensitive adhesive layer of 50 μm in thickness. Furthermore, the layer was subjected to aging in an atmosphere of 50° C. for 2 days to prepare a pressure-sensitive adhesive tape.

Comparative Example 3-2

In 150 parts of toluene were dissolved 100 parts of a styrene-isoprene-styrene block polymer (Cariflex TR1107, trade name, made by Shell Chemical Co.), 50 parts of a petroleum resin, and 1 part of a phenol series antioxidant to provide a solution of a pressure-sensitive adhesive composition. The solution was coated on a PET film of 38 μm in thickness by an applicator, followed by drying at 100° C. for 3 minutes, to form a pressure-sensitive adhesive layer of 50 μm in thickness. Furthermore, the layer was subjected to aging in an atmosphere of 50° C. for 2 days to prepare a pressure-sensitive adhesive tape.

With respect to each of the pressure-sensitive adhesive tapes obtained in Examples 3-1 to 3-4, Reference Example 3-1, and Comparative Example 3-1 and 3-2, the solvent-insoluble components, the self-adhesive strength, the heat resistance, and weather resistance were measured. The results are as shown in Table 3-1 below.

In addition, the solvent-insoluble component was measured by the method described above and the self-adhesive strength, the heat resistance, and the weather resistance were measured by the following methods.

Measurement of Self-adhesive Strength

Two pressure-sensitive adhesive tapes each having a width of 20 mm and a length of 150 mm were stuck to each other at the pressure-sensitive adhesive surfaces of the central portions thereof using a roller of 2 kg, and the releasing strength was measured under the conditions of an atmospheric temperature of 23° C., 20 minutes after sticking, and a releasing rate of 300 mm/minute.

Measurement of Heat Resistance

The pressure-sensitive adhesive tape was stuck to a stainless steel plate (SUS 304), after allowing to stand for 7 days at an atmospheric temperature of 80° C., the tape was released by the hand, and the presence or absence of stain was confirmed. The criteria for the evaluation were as follows.

A: No adhesive remained.
B: Adhesive partially remained (area ratio: less than 5%).
C: Adhesive remained (area ratio: not less than 5%).

Measurement of Weather Resistance

The pressure-sensitive adhesive tape was stuck to a stainless steel plate (SUS 304) as an adherend, after exposed in the open air (directing the south, 30° C.) for 30 days, the plate was released by the hand, and the presence or absence of stain was confirmed. The criteria for the evaluation were as follows.

A: No adhesive remained.
B: Adhesive partially remained (area ratio: less than 5%).
C: Adhesive remained (area ratio: not less than 5%).

TABLE 3-1

|  | Solvent-Insoluble Component (weight %) | Self-Adhesive Strength (kg/ 20 mm width) | Heat Resistance | Weather Resistance |
| --- | --- | --- | --- | --- |
| Ex 3-1 | 10 | 5.5 | A | A |
| Ex 3-2 | 12 | 5.2 | A | A |
| Ex 3-3 | 8 | 4.8 | A | A |
| Ex 3-4 | 5 | 4.2 | A | A |
| RE 3-1 | 40 | 1.5 | A | A |
| CE 3-1 | 0 | 1.9 | C | C |
| CE 3-2 | 0 | 1.6 | C | C |

Ex: Example
RE: Reference Example
CE: Comparative Example

As is apparent from the above Table 3-1, it can be seen that each of the pressure-sensitive adhesive tapes in Examples 3-1 to 3-4 having the pressure-sensitive adhesive compositions of the present invention, while being tack free at room temperature, shows a good self-adhesive strength and also shows the good durability such as the excellent heat resistance and weather resistance. On the other hand, the pressure-sensitive adhesive tapes in Reference Example 3-1 and Comparative Examples 3-1 and 3-2 are inferior in the self-adhesive strength or are inferior in the durability such as the heat resistance and the weather resistance.

Example 4-1

In a reaction vessel equipped with a condenser, a nitrogen introducing tube, a thermometer, and a stirrer were placed 50 parts of ethyl acetate and 50 parts of toluene as solvents, 80 parts of 2-ethylhexyl acrylate, 12 parts of n-butyl acrylate, 8 parts of acrylic acid, 0.1 part of 2-hydroxyethyl acrylate, and 0.1 part of 2,2'-azobisisobutyronitrile, the polymerization was carried out in a nitrogen gas stream to provide a solution of an acrylic polymer A having a glass transition temperature of −43° C. and a weight average molecular weight of 600,000.

Apart from this, in a reaction vessel equipped with a thermometer, a stirrer, and a water separator were placed 100 parts of polycarbonate diol (PLACCEL CD220PL, trade name, made by DAICEL CHEMICAL INDUSTRIES, LTD., hydroxy group value 56.1 KOH mg/g), 10.1 parts of sebacic acid, and 0.025 part of DBTO as a catalyst and the temperature of the mixture was raised to 180° C. with stirring in the presence of toluene as a reaction water discharging solvent. After a while, the outflow and the separation of water were observed. By carrying out the reaction for about 24 hours, a solution of a polyester series polymer B having a weight average molecular weight of 60,000 was obtained.

The solution of the acrylic polymer A described above was mixed with the solution of the polyester series polymer B described above such that the polyester series polymer B became 20 parts per 80 parts of the acrylic polymer A and further 2 parts of the tolylene diisocyanate addition product of trimethylolpropane was further added to the mixture, followed by mixing, to provide a solution of a pressure-sensitive adhesive composition. Then, the solution of the pressure-sensitive adhesive composition was coated on one surface of a polyester film of 38 μm in thickness at a dry thickness of 50 μm, followed by drying at 120° C. for 2 minutes, to prepare a pressure-sensitive adhesive tape.

Also, the solution was coated on one surface of a polyester film subjected to a release coating in the same manner as above to prepare a sample for measuring the solvent-insoluble component.

Example 4-2

The solution of the acrylic polymer A and the solution of the polyester series polymer B obtained in Example 4-1 were mixed with each other such that the polyester series polymer B became 50 parts per 50 parts of the acrylic polymer A, and 2 parts of the tolylene diisocyanate addition product of trimethylolpropane was added to the mixture, followed by mixing, to provide a solution of a pressure-sensitive adhesive composition. Using the solution, a pressure-sensitive adhesive tape was prepared in the same manner as in Example 4-1. Also, in the same manner as in Example 4-1, a sample for measuring the solvent-insoluble component was prepared.

Example 4-3

The solution of the acrylic polymer A and the solution of the polyester series polymer B obtained in Example 4-1 were mixed with each other such that the polyester series polymer B became 80 parts per 20 parts of the acrylic polymer A, and 2 parts of the tolylene diisocyanate addition product of trimethylolpropane was added to the mixture, followed by mixing, to provide a solution of a pressure-sensitive adhesive composition. Using the solution, a pressure-sensitive adhesive tape was prepared in the same manner as in Example 4-1. Also, a sample for measuring the solvent-insoluble component was prepared in the same manner as in Example 4-1.

Example 4—4

The solution of the polyester series polymer B obtained in Example 4-1 was coated on a separator and dried at 80° C. for one hour to provide the solid component of the polyester series polymer B. Then, 40 parts of the solid component was dissolved in a monomer mixture (the glass transition temperature of the copolymer of the mixture was −40° C.) composed of 48 parts of 2-ethylhexyl acrylate, 12 parts of acryloylmorpholine, and 0.06 part of 2-hydroxyethyl acrylate, and further 0.1 part of 2,2-dimethoxy-2-phenylacetophenone and 2 parts of the tolylene diisocyanate addition product of trimethylolpropane were added to the solution, followed by mixing.

The mixed solution was coated on one surface of a polyester film of 38 μm in thickness such that the thickness after the irradiation of ultraviolet rays was 50 μm and thereafter the coated layer was irradiated by ultraviolet rays to polymerize the above-described monomer mixture and cure, thereby a pressure-sensitive adhesive tape was prepared.

Also, the mixed solution was coated on one surface of a polyester film subjected to a releasing treatment in the same manner as above and then irradiated with ultraviolet rays to prepare a sample for measuring the solvent-insoluble component.

Reference Example 4-1

To the solution of the polyester series polymer B obtained in Example 4-1 was added 2 parts of the tolylene diisocyanate addition product of trimethylolpropane per 100 parts of the polyester series polymer B, followed by mixing, to provide a solution of a pressure-sensitive adhesive composition. Using the solution, a pressure-sensitive adhesive tape was prepared in the same manner as in Example 4-1. Also, a sample for measuring solvent-insoluble components was prepared in the same manner as in Example 4-1.

Comparative Example 4-1

To the solution of the acrylic polymer A obtained in Example 4-1 was added 2 parts of the tolylene diisocyanate addition product of trimethylolpropane per 100 parts of the acrylic polymer A, followed by mixing, to provide a solution of a pressure-sensitive adhesive composition. Using the solution, a pressure-sensitive adhesive tape was prepared in the same manner as in Example 4-1. Also, a sample for measuring solvent-insoluble components was prepared in the same manner as in Example 4-1.

Comparative Example 4-2

To the solution of the acrylic polymer A obtained in Example 4-1 were added 20 parts of polycarbonate diol (PLACCEL CD220PL, trade name, made by DAICEL CHEMICAL INDUSTRIES, LTD., hydroxy group value 56.1 KOH mg/g) and 2 parts of the tolylene diisocyanate addition product of trimthylolpropane, followed by mixing, to provide a solution of a pressure-sensitive adhesive composition. Using the solution of the pressure-sensitive adhesive composition, a pressure-sensitive adhesive tape was prepared in the same manner as in Example 4-1. Also, a sample for measuring the solvent-insoluble component was prepared in the same manner as in Example 4-1.

With respect to the pressure-sensitive adhesive tapes prepared in Examples 4-1 to 4—4, Reference Example 4-1, and Comparative Examples 4-1 and 4-2, the adhesive strength and the holding power were measured by the methods described below. The obtained results are shown in Table 4-1 below, along with the solvent-insoluble components of the pressure-sensitive adhesive compositions, which were measured by the method described above.

In the same table, "$X_1$" in the column of the solvent-insoluble component indicates the results obtained by the use of toluene as the solvent and "$X_2$" indicates the results obtained by the use of ethyl acetate as the solvent. In the case of using ethyl acetate, after the sample was immersed in the solvent for 3 days at room temperature, the sample was dried at 100° C. for 2 hours, weighed, and calculated.

Adhesive Strength

The pressure-sensitive adhesive tape of 20 mm×100 mm was press-stuck to an adherend by a method of reciprocating once a roller of 2 kg, after allowing to stand for 20 minutes at 23° C. and 48 hours at 70° C., the 180 degree peel adhesive strength was measured in an atmosphere of 23° C. and 65% RH at a pulling rate of 300 mm/minute. As the adherend, a polycarbonate plate, an acrylic resin plate and a stainless steel (SUS 430BA) plate were used. In the table, "A" is a polycarbonate plate, "B" is an acrylic resin plate, and "C" is a stainless steel plate.

Holding Power

The pressure-sensitive adhesive tape having a width of 10 mm was stuck to a phenol resin plate with the adhered area of 10 mm×20 mm, and after 20 minutes since then, was allowed to stand at 80° C. for 20 minutes. Then, the phenol resin plate was hung down, a uniform load of 500 g was applied to a free end of the pressure-sensitive adhesive tape, and the falling time (minute) of the pressure-sensitive adhesive tape at 80° C. and the slipped distance (mm) thereof after 120 minutes were measured.

TABLE 4-1

| | Solvent-Insoluble Component (weight %) | | Adhesive Strength (g/20 mm width) | | | Holding Power | |
|---|---|---|---|---|---|---|---|
| | $X_1$ | $X_2$ | A | B | C | Time (min) | (S)* (mm) |
| E 4-1 | 56 | 57 | 1,520 | 1,450 | 1,180 | >120 | 1 |
| E 4-2 | 55 | 55 | 1,800 | 1,560 | 1,100 | >120 | 1 |
| E 4-3 | 53 | 52 | 1,920 | 1,720 | 1,060 | >120 | 1 |
| E 4-4 | 64 | 65 | 1,820 | 1,650 | 1,250 | >120 | ≤0.5 |
| R 4-1 | 54 | 55 | 2,260 | 1,900 | 620 | >120 | 1.5 |
| C 4-1 | 60 | 60 | 1,150 | 1,280 | 1,160 | >120 | ≤0.5 |
| C 4-2 | 25 | 25 | 1,200 | 1,320 | 1,250 | 5 | — |

(S)*: Slipped distance
E: Example
R: Reference Example
C: Comparative Example

From the above Table 4-1, it is clear that the pressure-sensitive adhesive tapes of Examples 4-1 to 4—4 have a large adhesive strength to various adherends, in particular to plastics such as polycarbonate, an acrylic resin, etc., and also have a large holding power and are excellent in the durability.

Example 5-1

In a reaction vessel equipped with a thermometer, a stirrer, and a water separator were placed 100 parts of polycarbonate diol (PLACCEL CD220PL, trade name, made by DAICEL CHEMICAL INDUSTRIES, LTD., hydroxy group value 56.1 KOH mg/g), 10.1 parts of sebacic acid, and 0.025 part of DBTO and the temperature of the mixture was raised to 180° C. with stirring in the presence of toluene as a reaction water discharging solvent. After a while, the outflow and the separation of water were observed. By continuing the reaction for about 24 hours, a solution of a polyester series polymer having a weight average molecular weight of 60,000 was obtained.

To the solution of the polyester series polymer were added 30 parts of a terpenephenol resin having a softening point of 115° C. and 2 parts of the hexamethylene diisocyanate addition product of trimethylolpropane per 100 parts of the solid components thereof, followed by mixing, to provide a solution of a heat pressure-sensitive adhesive composition. Then, the solution of the heat pressure-sensitive adhesive composition was coated on one surface of a polyester film of 38 µm in thickness at a dry thickness of 50 µm, followed by drying at 120° C. for 2 minutes, to prepare a pressure-sensitive adhesive tape for measuring the holding power.

Also, the solution was coated on one surface of a polyester film subjected to a release coating by the same manner as above to prepare a pressure-sensitive adhesive tape for measuring the shear adhesive strength and the shock resistance.

Example 5-2

By following the same procedure as in Example 5-1 except that 20 parts of a rosinphenol resin having a softening temperature of 145° C. was used in place of 30 parts of the terpenephenol resin having a softening point of 115° C., a solution of a heat pressure-sensitive adhesive composition was prepared. Using the solution, the pressure-sensitive adhesive tapes for measuring the holding power and for measuring the shear adhesive strength and the shock resistance were prepared.

Example 5-3

By following the same procedure as Example 5-1 except that 50 parts of a coumarone-indene resin having a softening point of 120° C. was used in place of 30 parts of the terpenephenol resin having a softening point of 115° C., a solution of a heat pressure-sensitive adhesive composition was prepared and using the solution, pressure-sensitive adhesive tapes for measuring the holding power and for measuring the shear adhesive strength and the shock resistance were prepared.

Reference Example 5-1

To the solution of the polyester series polymer obtained in Example 5-1 was added 2 parts of the tolylene diisocyante addition product of trimethylolpropane per 100 parts of the solid components thereof, followed by mixing, to provide a solution of a heat pressure-sensitive adhesive composition. Then, using the solution of the heat pressure-sensitive adhesive composition, pressure-sensitive adhesive tapes for measuring the holding power and for measuring the shear adhesive strength and the shock resistance were prepared in the same manners as in Example 5-1.

Reference Example 5-2

By following the same procedure as in Example 5-1 except that 30 parts of a terpenephenol resin having a softening point of 50° C. was used in place of 30 parts of the terpenephenol resin having a softening point of 115° C., a solution of a heat pressure-sensitive adhesive composition was prepared. Using the solution, pressure-sensitive adhesive tapes for measuring the holding power and for measuring the shear adhesive strength and the shock resistance were prepared.

Comparative Example 5-1

In a reaction vessel equipped with a condenser, a nitrogen introducing tube, a thermometer, and a stirrer were placed 50 parts of ethyl acetate and 50 parts of toluene as solvents, 50 parts of 2-ethylhexyl acrylate, 45 parts of n-butyl acrylate, 4.9 parts of acrylic acid, 0.1 part of 2-hydroxyethyl acrylate, and 0.1 part of 2,2'-azobisisobutyronitrile, the polymerization was carried out in a nitrogen gas stream to provide a solution of an acrylic polymer having a weight average molecular weight of 700,000.

To the solution of the polyester series polymer were added 30 parts of a terpenephenol resin having a softening point of 115° C. and 2 parts of the hexamethylene diisocyanate addition product of trimethylolpropane per 100 parts of the solid components thereof, followed by mixing, to provide a solution of a heat pressure-sensitive adhesive composition. Then, using the solution of the heat pressure-sensitive adhesive composition, pressure-sensitive adhesive tapes for measuring the holding power and for measuring the shear adhesive strength and the shock resistance were prepared.

With respect to each of the pressure-sensitive adhesive tapes prepared in Examples 5-1 to 5-3, Reference Examples 5-1 and 5-2, and Comparison Example 5-1, the holding power, the shear adhesive strength, and the shock resistance were measured by the following methods. The results are as shown in Table 5-1 below.

Holding Power

The pressure-sensitive adhesive tape having a width of 10 mm was stuck to a phenol resin plate with the adhered area of 10 mm×20 mm under the conditions of 120° C., 5 kg/cm$^2$, and one minute, and after 20 minutes, was allowed to stand at 80° C. for 20 minutes. Then, the phenol resin plate was hung down, a uniform load of 500 g was applied to a free end of the pressure-sensitive adhesive tape, and the falling time (minute) of the pressure-sensitive adhesive tape at 80° C. was measured.

Shear Adhesive Strength

The pressure-sensitive adhesive tape of 10 mm×10 mm was stuck between an aluminum plate of 0.5 mm×20 mm×100 mm and a PC plate of 2.0 mm×20 mm×100 mm, adhered under the conditions of 120° C., 5 kg/cm$^2$, and 2 minutes, and allowed to stand for 2 hours, and then the strength required for the shearing was measured under the condition of a pulling rate of 10 mm/minute in the atmospheres of normal temperature (23° C., 65% RH) and a high temperature (80° C.) respectively.

Shock Resistance

The pressure-sensitive adhesive tape of 10 mm×10 mm was stuck between a PC plate of 2 mm×60 mm×60 mm and a SUS 304 plate of 0.5 mm×50 mm×50 mm, adhered under the conditions of 120° C., 5 kg/cm$^2$, and one minute, after allowing to stand for 2 hours, the assembly was fallen onto a concrete from a height of 80 cm at 0° C. and the number required to be broken was measured.

TABLE 5-1

| | Holding Power | Shear Adhesive Strength (kg/cm$^2$) | | Shock Resistance |
|---|---|---|---|---|
| | (minute) | 23° C. | 80° C. | (times) |
| Ex 5-1 | >120 | 32 | 10 | >10 |
| Ex 5-2 | >120 | 35 | 12 | >10 |
| Ex 5-3 | >120 | 27 | 8 | >10 |
| RE 5-1 | >120 | 22 | 5 | >10 |
| RE 5-2 | 50 | 25 | 2 | >10 |
| CE 5-1 | >120 | 28 | 3 | 2 |

Ex: Example
RE: Reference Example
CE: Comparative Example

From the above Table 5-1, it can be seen that each of the pressure-sensitive adhesive tapes of Examples 5-1 to 5-3 satisfies the holding power (creep resistance) at a high temperature (80° C.) and the shear adhesive strength at normal temperature and a high temperature and is excellent in the shock resistance at a low temperature (0° C.).

Example 6-1

In a four-neck separable flask equipped with a stirrer, a thermometer, and a water separator were placed 200.0 g (hydroxy group: 0.41 equivalent) of polycarbonate diol (PLACCEL CD210PL, trade name, made by DAICEL CHEMICAL INDUSTRIES, LTD.; hydroxy group value 115.0 KOH mg/g), 20.51 g (acid group: 0.41 equivalent) of succinic anhydride, and 102 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 27 hours, a polyester having a weight average molecular weight of 56,000 was obtained.

After diluting the polyester with toluene to a solid component concentration of 50% by weight, 1.0 part (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The pressure-sensitive composition was coated on a PET film of 38 μm in thickness by an applicator, followed by drying at 130° C. for 3 minutes, to form a pressure-sensitive adhesive layer of 50 μm in thickness. Furthermore, a polyethylene film of 60 μm in thickness was stuck to the pressure-sensitive adhesive surface to obtain a pressure-sensitive adhesive sheet.

Example 6-2

In a four-neck separable flask equipped with a stirrer, a thermometer, and a water separator were placed 250 g (hydroxy group: 0.51 equivalent) of polycarbonate diol (PLACCEL CD210PL, trade name, made by DAICEL CHEMICAL INDUSTRIES, LTD.; hydroxy group value 115.0 KOH mg/g), 51.8 g (acid group: 0.51 equivalent) of sebacic acid and 127 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 30 hours, a polyester having a weight average molecular weight of 60,000 was obtained.

After diluting the polyester with toluene to a solid component concentration of 50% by weight, 1.5 parts (solid components) of the tolylene diisocyanate addition product of trimethylolpropane (Coronate L, trade name, made by Nippon Polyurethane Industry Co., Ltd.) per 100 parts (solid component) of the polyester was added thereto as a crosslinking agent to provide a pressure-sensitive adhesive composition. The pressure-sensitive composition was coated on a PET film of 38 μm in thickness by an applicator, followed by drying at 130° C. for 5 minutes, to form a pressure-sensitive adhesive layer of 50 μm in thickness. Furthermore, a polyethylene film of 40 μm in thickness was stuck to the pressure-sensitive adhesive surface to prepare a pressure-sensitive adhesive sheet.

Example 6-3

In a four-neck separable flask equipped with a stirrer, a thermometer, and a water separator were placed 250.0 g (hydroxy group: 0.25 equivalent) of polycarbonate diol (PLACCEL CD220PL, trade name, made by DAICEL CHEMICAL INDUSTRIES, LTD.; hydroxy group value 56.1 KOH mg/g), 26.8 g (acid group: 0.26 equivalent) of sebacic acid and 62 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 31 hours, a polyester having a weight average molecular weight of 74,000 was obtained.

After diluting the polyester with toluene to a solid component concentration of 50% by weight, 1.5 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The pressure-sensitive composition was coated on a PET film of 38 μm in thickness by an applicator, followed by drying at 130° C. for 5 minutes, to form a pressure-sensitive adhesive layer of 50 μm in thickness. Furthermore, a polyethylene film of 40 μm in thickness was stuck to the pressure-sensitive adhesive surface to prepare a pressure-sensitive adhesive sheet.

Example 6-4

The polyester obtained in Example 6-3 was diluted with toluene to a solid component concentration of 50% by weight. To 100 parts (solid components) of the polyester was added 2.0 parts (solid components) of the hexamethylene diisocyanate addition product of trimethylolpropane (Coronate HL, trade name, made by Nippon Polyurethane Industry Co., Ltd.) to provide a pressure-sensitive adhesive composition. The pressure-sensitive adhesive composition was coated on a PET film of 60 μm in thickness by an applicator, followed by drying at 80° C. for 10 minutes, to form a pressure-sensitive adhesive layer of 50 μm in thickness. Furthermore, a polyethylene film of 60 μm in thickness was stuck to the pressure-sensitive adhesive surface to prepare a pressure-sensitive adhesive sheet of a base material-less double faced pressure-sensitive adhesive type.

Example 6-5

In a four-neck separable flask equipped with a stirrer, a thermometer, and a water separator were placed 250.0 g (hydroxy group: 0.25 equivalent) of polycarbonate diol (PLACCEL CD220PL, trade name, made by DAICEL CHEMICAL INDUSTRIES, LTD.; hydroxy group value 56.1 KOH mg/g), 25.0 g (acid group: 0.25 equivalent) of sebacic acid and 70 mg of titanium tetraisopropoxide as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 24 hours, a polyester having a weight average molecular weight of 59,000 was obtained.

After diluting the polyester with toluene to a solid component concentration of 50% by weight, 1.5 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The pressure-sensitive composition was coated on a PET film of 38 μm in thickness by an applicator, followed by drying at 130° C. for 5 minutes, to form a pressure-sensitive adhesive layer of 50 μm in thickness. Furthermore, a polyethylene film of 60 μm in thickness was stuck to the pressure-sensitive adhesive surface to prepare a pressure-sensitive adhesive sheet.

Example 6-6

In a four-neck separable flask equipped with a stirrer, a thermometer, and a water separator were placed 155.4 g of polycarbonate diol (PLACCEL CD220PL, trade name, made by DAICEL CHEMICAL INDUSTRIES, LTD.; hydroxy group value 56.1 KOH mg/g) and 84.1 g (total hydroxy groups: 0.24 equivalent) of polycaprolactone diol (PLACCEL 220PL, trade name, made by DAICEL CHEMICAL INDUSTRIES, LTD.; hydroxy group value: 55.9 KOH mg/g), 12.1 g (acid group: 0.24 equivalent) of succinic anhydride and 59 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 20 hours, a polyester having a weight average molecular weight of 37,000 was obtained.

After diluting the polyester with toluene to a solid component concentration of 50% by weight, 3.0 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The pressure-sensitive adhesive composition was coated on a PET film of 38 μm in thickness by an applicator, followed by drying at 130° C. for 5 minutes, to form a pressure-sensitive adhesive layer of 50 μm in thickness. Furthermore, a polyethylene film of 60 μm in thickness was stuck to the pressure-sensitive adhesive surface to prepare a pressure-sensitive adhesive sheet.

Example 6-7

In a four-neck separable flask equipped with a stirrer, a thermometer, and a water separator were placed 218.1 g of polycarbonate diol (PLACCEL CD220PL, trade name, made by DAICEL CHEMICAL INDUSTRIES, LTD.; hydroxy group value 56.1 KOH mg/g) and 24.2 g of octanediol (total hydroxy groups: 0.55 equivalent), 27.9 g (acid group: 0.56 equivalent) of succinic anhydride, and 60 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 22 hours, a polyester having a weight average molecular weight of 24,000 was obtained.

After diluting the polyester with toluene to a solid component concentration of 50% by weight, 3.0 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The pressure-sensitive adhesive composition was coated on a PET film of 38 μm in thickness by an applicator, followed by drying at 130° C. for 5 minutes, to form a pressure-sensitive adhesive layer of 50 μm in thickness. Furthermore, a polyethylene film of 60 μm in thickness was stuck to the pressure-sensitive adhesive surface to prepare a pressure-sensitive adhesive sheet.

Example 6-8

In a four-neck separable flask equipped with a stirrer, a thermometer, and a water separator were placed 315.0 g (hydroxy group: 0.31 equivalent) of polycarbonate diol (PLACCEL CD220PL, trade name, made by DAICEL CHEMICAL INDUSTRIES, LTD.; hydroxy group value 55.4 KOH mg/g) and 16.3 g (acid group: 0.33 equivalent) of succinic anhydride, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 40 hours, a polyester having a weight average molecular weight of 39,000 was obtained.

After diluting the polyester with toluene to a solid component concentration of 50% by weight, 4.0 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The pressure-sensitive adhesive composition was coated on a PET film of 38 μm in thickness by an applicator, followed by drying at 130° C. for 5 minutes, to form a pressure-sensitive adhesive layer of 50 μm in thickness. Furthermore, a polyethylene film of 60 μm in thickness was stuck to the pressure-sensitive adhesive surface to prepare a pressure-sensitive adhesive sheet.

Comparative Example 6-1

To a monomer mixture of 92 parts of butyl acrylate and 8 parts of acrylic acid were added 150 parts of toluene and 0.1 part of azobisisobutronitrile to provide a mixed solution and the mixed solution was solution-polymerized in a nitrogen gas atmosphere at 60° C. for about 7 hours to provide a polymer solution. To 100 parts (solid components) of the polymer was added 2.0 parts (solid components) of the tolylene diisocyanate addition product of trimethylolpropane (Coronate L, trade name, made by Nippon Polyurethane Industry Co., Ltd.) as a crosslinking agent to provide a pressure-sensitive adhesive composition. The pressure-sensitive adhesive composition was coated on a PET film of 38 μm in thickness by an applicator, followed by drying at 120° C. for 5 minutes, to form a pressure-sensitive adhesive layer of 50 μm. Furthermore, a blend film composed of polyethylene and polypropylene of 40 μm in thickness was stuck to the pressure-sensitive adhesive surface to prepare a pressure-sensitive adhesive sheet.

Comparative Example 6-2

In 150 parts of toluene were dissolved 100 parts of natural rubber, 100 parts of an aliphatic petroleum resin (softening point 100° C.), and 20 parts of a softening agent (polybutene) and 1.5 parts (solid components) of the tolylene diisocyanate addition product of trimethylolpropane (Coronate L, trade name, made by Nippon Polyurethane Industry Co., Ltd.) was added to the solution as a crosslinking agent to provide a pressure-sensitive adhesive composition. The pressure-sensitive adhesive composition was coated on a PET film of 38 μm in thickness by an applicator, followed by drying at 100° C. for 5 minutes, to form a pressure-sensitive adhesive layer of 50 μm in thickness. Furthermore, a polyethylene film of 60 μm in thickness was stuck to the pressure-sensitive adhesive surface to prepare a pressure-sensitive adhesive sheet.

With respect to each of the pressure-sensitive adhesive sheets obtained in Examples 6-1 to 6-8 and Comparative Examples 6-1 and 6-2, the releasing strength of a release liner and the adhesive strength were measured by the following methods. The results are shown in Table 6-1 below.

Measurement of Releasing Strength

The release liner was released from the pressure-sensitive adhesive sheet by an Instron type tension tester at an atmospheric temperature of 23° C. and under the condition of a releasing rate of 300 mm/minute, and the releasing strength was measured at a releasing angle of 180 degree.

Measurement of Adhesive Strength

The release liner was released from the pressure-sensitive adhesive sheet, the sheet was stuck to an aluminum plate, and the 180 degree peel pressure-sensitive adhesive strength was measured under the conditions of an atmospheric temperature of 23° C., a stuck time of 30 minutes, and a releasing rate of 300 mm/minute. With respect to the sample of Example 6-4, the measurement was effected after backing a PET film of 38 μm in thickness, because the sample did not have a base material.

TABLE 6-1

|  | Releasing Strength (g/50 mm width) | Adhesive Strength (g/20 mm width) |
| --- | --- | --- |
| Example 6-1 | 15 | 1,500 |
| Example 6-2 | 20 | 1,300 |
| Example 6-3 | 45 | 1,100 |
| Example 6-4 | 15 | 1,100 |
| Example 6-5 | 9 | 2,200 |
| Example 6-6 | 10 | 2,300 |
| Example 6-7 | 17 | 1,600 |
| Example 6-8 | 25 | 1,700 |
| C. Example 6-1 | 900 | 1,100 |
| C. Example 6-2 | 800 | 1,300 |

C. Example: Comparative Example

It can be seen from the results shown in the above Table 6-1 that each of the pressure-sensitive adhesive sheets obtained in Examples 6-1 to 6-8 shows a small releasing strength which does not give a hindrance to the releasing work and has a large adhesive strength which is desired in the practical use although they use release liners not subjected to a silicone release coating.

Example 7-1

In a four-neck separable flask equipped with a stirrer, a thermometer, and a water separator were placed 200.0 g (hydroxy group: 0.41 equivalent) of polycarbonate diol (PLACCEL CD210PL, trade name, made by DAICEL CHEMICAL INDUSTRIES, LTD.; hydroxy group value 115.0 KOH mg/g), 20.51 g (acid group: 0.41 equivalent) of succinic anhydride, and 102 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 30 hours, a polyester having a weight average molecular weight of 65,000 was obtained.

After diluting the polyester with toluene to a solid component concentration of 40% by weight, 3 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive solution. The pressure-sensitive adhesive solution was coated on a PET film of 38 μm in thickness by an applicator, followed by drying at 130° C. for 5 minutes, to form a pressure-sensitive adhesive layer of 30 μm in thickness. Furthermore, the layer was subjected to aging in an atmosphere of 50° C. for 2 days as post cure to prepare a pressure-sensitive adhesive tape.

Example 7-2

In a four-neck separable flask equipped with a stirrer, a thermometer, and a water separator were placed 250.0 g (hydroxy group: 0.512 equivalent) of polycarbonate diol (PLACCEL CD210PL, trade name, made by DAICEL CHEMICAL INDUSTRIES, LTD.; hydroxy group value 115.0 KOH mg/g), 37.44 g (acid group: 0.512 equivalent) of adipic acid, and 127 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 30 hours, a polyester having a weight average molecular weight of 72,000 was obtained.

After diluting the polyester with toluene to a solid component concentration of 40% by weight, 3 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive solution. The solution was coated on a PET film of 38 μm in thickness by an applicator, followed by drying at 130° C. for 5 minutes, to form a pressure-sensitive adhesive layer of 30 μm in thickness. Furthermore, the layer was subjected to aging in an atmosphere of 50° C. for 2 days as post cure to prepare a pressure-sensitive adhesive tape.

Example 7-3

In a four-neck separable flask equipped with a stirrer, a thermometer, and a water separator were placed 250.0 g (hydroxy group: 0.25 equivalent) of polycarbonate diol (PLACCEL CD220PL, trade name, made by DAICEL CHEMICAL INDUSTRIES, LTD.; hydroxy group value 56.1 KOH mg/g), 25.28 g (acid group: 0.25 equivalent) of sebacic acid, and 62 mg of DBTO as a catalyst, the temperature of the mixture was raised to 180° C. while stirring in the presence of a small amount of xylene as a reaction water discharging solvent, and the mixture was maintained at the temperature. After a while, the outflow and separation of water were observed and the reaction began to proceed. By continuing the reaction for about 20 hours, a polyester having a weight average molecular weight of 55,000 was obtained.

After diluting the polyester with toluene to a solid component concentration of 50% by weight, 3 parts (solid components) of a hexamethylene diisocyanate trimer (isocyanurate) (Coronate HX, trade name, made by Nippon Polyurethane Industry Co., Ltd.) per 100 parts (solid component) of the polyester was added thereto as a crosslinking agent to provide a pressure-sensitive adhesive solution. The solution was coated on a PET film of 38 μm in thickness by an applicator, followed by drying at 130° C. for 5 minutes, to form a pressure-sensitive adhesive layer of 30 μm in thickness. Furthermore, the layer was subjected to aging in an atmosphere of 50° C. for 2 days as post cure to prepare a pressure-sensitive adhesive tape.

Example 7-4

To 100 parts (solid components) of the polyester obtained in Example 7-3 was added 5 parts of trimethylolpropane triacrylate as a substantial crosslinking agent to provide a pressure-sensitive adhesive solution. The pressure-sensitive adhesive solution was coated on a PET film of 38 μm in thickness by an applicator, followed by drying at 100° C. for 5 minutes, to form a pressure-sensitive adhesive layer of 30 μm in thickness. Furthermore, the layer was irradiated with electron rays at 5 Mrad to prepare a pressure-sensitive adhesive tape.

Comparative Example 7-1

To 100 parts (solid components) of the polyester obtained in Example 7-3 was added 2 parts (solid components) of diphenylmethane diisocyanate (Millionate MT, trade name, made by Nippon Polyurethane Industry Co., Ltd.) as a crosslinking agent to provide a pressure-sensitive adhesive solution. The pressure-sensitive adhesive solution was coated on a PET film of 38 μm in thickness by an applicator, followed by drying at 130° C. for 5 minutes, to form a pressure-sensitive adhesive layer of 30 μm in thickness. Furthermore, the layer was subjected to aging in an atmosphere of 50° C. for 2 days as post cure to prepare a pressure-sensitive adhesive tape.

Comparative Example 7-2

In 150 parts of toluene were dissolved 100 parts of a styrene-isoprene-styrene block polymer (Cariflex TR1107, trade name, made by Shell Chemical Co.), 50 parts of a petroleum resin, and 1 part of a phenol series antioxidant to provide a pressure-sensitive adhesive solution. The solution was coated on a PET film of 38 μm in thickness by an applicator, followed by drying at 100° C. for 3 minutes, to form a pressure-sensitive adhesive layer of 30 μm in thickness. Thus, a pressure-sensitive adhesive tape was prepared.

With respect to each of the pressure-sensitive adhesive tapes obtained in Examples 7-1 to 7-4 and Comparative Examples 7-1 and 7-2, the solvent-insoluble component, the self-adhesive strength, and the removability were measured by the following methods. Also, the evaluation of tack free (presence or absence of tack) was carried out. These test results are shown in Table 7-1 below.

The measurement of the solvent-insoluble component was carried out in the same manner as in "Measurement of Solvent-Insoluble Component" in Example 2-4.

The measurement of the self-adhesive strength was carried out by the same manner as in "Measurement of Self-adhesive strength" in Comparative Example 3-2.

Measurement of Removability

At an atmospheric temperature of 23° C., two pressure-sensitive adhesive tapes each having a width of 20 mm and a length of 150 mm were stuck to each other at the pressure-sensitive adhesive surfaces of the central portions thereof by a roller of 2 kg, and after storing for 24 hours at the same temperature, the peeling strength was measured under the conditions of a releasing rate of 300 mm/minute.

Evaluation of Tack Free

The pressure-sensitive adhesive surface of the pressure-sensitive adhesive tape was contacted with a finger and the case of feeling no tack was evaluated by "A", the case of feeling tack was evaluated by "B".

TABLE 7-1

|  | Solvent-Insoluble Component (weight %) | Self-adhesive Strength (g/20 mm width) | Removability (g/20 mm width) | Tack Free |
|---|---|---|---|---|
| Ex 7-1 | 75 | 650 | 950 | A |
| Ex 7-2 | 81 | 580 | 870 | A |
| Ex 7-3 | 88 | 520 | 790 | A |
| Ex 7-4 | 66 | 620 | 850 | A |
| CE 7-1 | 15 | 4,580 | 5,320 | A |
| CE 7-2 | 0 | 1,920 | 2,350 | B |

Ex: Example
CE: Comparative Example

As is clear from the result shown of above Table 7-1, each of the pressure-sensitive adhesive tapes in Examples 7-1 to 7-4 was, in spite of tack free, had a good self-adhesive strength and also was excellent in the removability. On the other hand, the pressure-sensitive tape of Comparative Example 7-1 had a large self-adhesive strength but was inferior in the removability and the pressure-sensitive adhesive tape of Comparative Example 7-2 had tack and also was inferior in the removability.

Example 8-1

In a four-neck separable flask equipped with a stirrer, a thermometer, and a water separator were placed 200.0 g (hydroxy group: 0.41 equivalent) of polycarbonate diol (PLACCEL CD210PL, trade name, made by DAICEL CHEMICAL INDUSTRIES, LTD.; hydroxy group value 115.0 KOH mg/g), 20.51 g (acid group: 0.41 equivalent) of succinic anhydride, and 102 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 27 hours, a polyester having a weight average molecular weight of 56,000 was obtained.

After diluting the polyester with toluene to a solid component concentration of 50% by weight, 1.0 part (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The pressure-sensitive adhesive composition was coated on a polyurethane foam of 1.2 mm in thickness by an applicator, followed by drying at 130° C. for 3 minutes, to form a pressure-sensitive adhesive layer of 50 µm in thickness. Furthermore, a polyethylene film of 100 µm in thickness was stuck to the surface of the pressure-sensitive adhesive layer to prepare a sealing material.

Example 8-2

In a four-neck separable flask equipped with a stirrer, a thermometer, and a water separator were placed 250.0 g (hydroxy group: 0.512 equivalent) of polycarbonate diol (PLACCEL CD210PL, trade name, made by DAICEL CHEMICAL INDUSTRIES, LTD.; hydroxy group value 115.0 KOH mg/g), 51.8 g (acid group: 0.512 equivalent) of sebacic acid, and 127 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 30 hours, a polyester having a weight average molecular weight of 60,000 was obtained.

After diluting the polyester with toluene to a solid component concentration of 50% by weight, 1.5 parts (solid components) of the tolylene diisocyanate addition product of trimethylolpropane (Coronate L, trade name, made by Nippon Polyurethane Industry Co., Ltd.) per 100 parts (solid component) of the polyester was added thereto as a crosslinking agent to provide a pressure-sensitive adhesive composition. The composition was coated on an SBR foam of 0.3 mm in thickness by an applicator, followed by drying at 130° C. for 5 minutes, to form a pressure-sensitive adhesive layer of 50 µm in thickness. Furthermore, a polyethylene film of 60 µm in thickness was stuck to the surface of the pressure-sensitive adhesive layer to prepare a sealing material.

Example 8-3

In a four-neck separable flask equipped with a stirrer, a thermometer, and a water separator were placed 250.0 g (hydroxy group: 0.26 equivalent) of polycarbonate diol (PLACCEL CD220PL, trade name, made by DAICEL CHEMICAL INDUSTRIES, LTD.; hydroxy group value 56.1 KOH mg/g), 26.8 g (acid group: 0.26 equivalent) of sebacic acid, and 62 mg of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 31 hours, a polyester having a weight average molecular weight of 74,000 was obtained.

After diluting the polyester with toluene to a solid component concentration of 50% by weight, 1.5 parts (solid components) of the hexamethylene diisocyanate addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The pressure-sensitive adhesive composition was coated on a polyurethane sheet of 0.5 mm in thickness by an applicator, followed by drying at 130° C. for 5 minutes, to form a pressure-sensitive adhesive layer of 50 μm in thickness. Furthermore, a polyethylene film of 100 μm in thickness was stuck to the surface of the pressure-sensitive adhesive layer to prepare a sealing material.

Example 8-4

The polyester obtained in Example 8-3 was diluted with toluene to a solid component concentration of 50% by weight. To 100 parts (solid components) of the polyester was added 2.0 parts (solid components) of the hexamethylene diisocyanate addition product of trimethylolpropane (Coronate HL, trade name, made by Nippon Polyurethane Industry Co., Ltd.) as a crosslinking agent to provide a pressure-sensitive adhesive composition. The pressure-sensitive adhesive composition was coated on a polyurethane foam of 1.2 mm in thickness by an applicator, followed by drying at 80° C. for 10 minutes, to form a pressure-sensitive adhesive layer of 50 μm in thickness. Furthermore, a polyethylene film of 60 μm in thickness was stuck to the surface of the pressure-sensitive adhesive layer to prepare a sealing material.

Comparative Example 8-1

To a monomer mixture of 92 parts of butyl acrylate and 8 parts of acrylic acid were added 150 parts of toluene and 0.1 part of azobisisobutyronitrile to provide a mixed solution and the mixed solution was solution-polymerized in a nitrogen gas atmosphere at 60° C. for about 7 hours to provide a polymer solution. To 100 parts (solid components) of the polymer was added 2.0 parts (solid components) of the tolylene diisocyanate addition product of trimethylolpropane (Coronate L, trade name, made by Nippon Polyurethane Industry Co., Ltd.) as a crosslinking agent to provide a pressure-sensitive adhesive composition. The pressure-sensitive adhesive composition was coated on a polyurethane foam of 1.2 mm in thickness by an applicator, followed by drying at 120° C. for 5 minutes, to form a pressure-sensitive adhesive layer of 50 μm. Furthermore, a blend film of polyethylene and polypropylene having a thickness of 50 μm was stuck to the pressure-sensitive adhesive surface to prepare a sealing material.

Comparative Example 8-2

In 150 parts of toluene were dissolved 100 parts of natural rubber, 100 parts of an aliphatic petroleum resin (softening point 100° C.), and 20 parts of a softening agent (polybutene), and 1.5 parts (solid components) of the tolylene diisocyanate addition product of trimethylolpropane (Coronate L, trade name, made by Nippon Polyurethane Industry Co., Ltd.) was added to the solution as a crosslinking agent to provide a pressure-sensitive adhesive composition. The pressure-sensitive adhesive composition was coated on a polyurethane form of 1.2 mm in thickness by an applicator, followed by drying at 100° C. for 5 minutes, to form a pressure-sensitive adhesive layer of 50 μm in thickness. Furthermore, a polyethylene film of 60 μm in thickness was stuck to the pressure-sensitive adhesive surface to prepare a sealing material.

With respect to each of the sealing materials obtained in Examples 8-1 to 8-4 and Comparative Examples 8-1 and 8-2, the adhesive strength, and the releasing strength of the release liner were measured by the following methods. The results are as shown in Table 8-1 below.

Measurement of Adhesive Strength

In an atmosphere of 23° C., 65% RH, the release liner was released from the sealing material, the sealing material was stuck to an aluminum plate, and after 30 minutes, the 180 degree peel adhesive strength was measured under the condition of a pulling rate of 300 mm/minute.

Measurement of Releasing Strength

In an atmosphere of 23° C., 65% RH, the release liner was released from the sealing material under the condition of a pulling rate of 300 mm/minute to measure the releasing strength.

TABLE 8-1

|  | Adhesive Strength (g/20 mm width) | Releasing Strength (g/50 mm width) |
| --- | --- | --- |
| Example 8-1 | 1,300 | 20 |
| Example 8-2 | 1,000 | 30 |
| Example 8-3 | 1,000 | 50 |
| Example 8-4 | 1,200 | 20 |
| C. Example 8-1 | 1,000 | 900 |
| C. Example 8-2 | 1,200 | 850 |

C. Example: Comparative Example

It is clear from the result of Table 8-1 that each of the sealing materials of Examples 8-1 to 8-4 shows a small releasing strength giving no hindrance to the releasing work and has a large adhesive strength desired for practical use in spite of using a release liner not subjected to a silicone release coating. On the other hand, it can be seen that in the sealing materials of Comparative Examples 8-1 and 8-2, the adhesive strength is large but because the releasing strength of the release liner is too large, it gives an hindrance to the releasing work.

Also, because the sealing materials of Examples 8-1 to 8-4 do not contain a silicone compound not only in the release liner but also in the sealing base material and the layer of the pressure-sensitive adhesive composition, when the sealing material is used as a connecting material for HDD, a siloxane gas does not generates in the inside of HDD, and a corrosion of the inside of HDD, an erroneous action of HDD, a head crash and the like caused by the gas are not caused, and the original sealing function based on the sealing base material, that is, the sealing function based on the elastic effect of a foamed material, etc., can be exhibited more effectively together with the good adhesive strength described above.

Example 8-5

The pressure-sensitive adhesive composition obtained in Example 8-1 was coated on an aluminum sheet of 80 μm in thickness by an applicator, followed by drying at 130° C. for 3 minutes, to form a pressure-sensitive adhesive layer of 50 μm in thickness. Furthermore, a polyethylene film of 100 μm in thickness was stuck to the surface of the pressure-sensitive adhesive layer to prepare a sealing material.

Example 8-6

The pressure-sensitive adhesive composition obtained in Example 8-2 was coated on an aluminum laminate sheet (a laminate sheet formed by vapor-depositing a metallic aluminum at a thickness of 30 μm on a polyethylene phthalate film of 50 μm in thickness) of 80 μm in thickness by an applicator, followed by drying at 130° C. for 5 minutes, to form a pressure-sensitive adhesive layer of 50 μm in thickness. Furthermore, a polyethylene film of 100 μm in thickness was stuck to the surface of the pressure-sensitive adhesive layer to prepare a sealing material.

Example 8-7

The pressure-sensitive adhesive composition obtained in Example 8-3 was coated on a fluorine resin (PTFE) sheet of 100 μm in thickness by an applicator, followed by drying at 130° C. for 5 minutes, to form a pressure-sensitive adhesive layer of 50 μm in thickness. Furthermore, a polyethylene film of 100 μm in thickness was stuck to the surface of the pressure-sensitive adhesive layer to prepare a sealing material.

Example 8-8

The pressure-sensitive adhesive composition obtained in Example 8-4 was coated on a fluorine resin-coated sheet (a sheet obtained by coating a fluorine resin (PTFE) at a thickness of 5 μm on a polyethylene terephthalate film of 50 μm in thickness) of 55 μm in thickness by an applicator, followed by drying at 80° C. for 10 minutes, to form a pressure-sensitive adhesive layer of 50 μm in thickness. Furthermore, a polyethylene film of 100 μm in thickness was stuck to the surface of the pressure-sensitive adhesive layer to prepare a sealing material.

Comparative Example 8-3

The pressure-sensitive adhesive composition obtained in Example 8-1 was coated on an aluminum sheet of 50 μm in thickness by an applicator, followed by drying at 120° C. for 5 minutes, to form a pressure-sensitive adhesive layer of 50 μm in thickness. Furthermore, a releasing paper (subjected to a silicone release coating) of 130 μm in thickness was stuck to the surface of the pressure-sensitive adhesive layer to prepare a sealing material.

Comparative Example 8-4

The pressure-sensitive adhesive composition obtained in Example 8-1 was coated on a polyethylene terephthalate film of 50 μm in thickness by an applicator, followed by drying at 130° C. for 3 minutes, to form a pressure-sensitive adhesive layer of 50 μm in thickness. Furthermore, a polyethylene film of 100 μm in thickness was stuck to the surface of the pressure-sensitive adhesive layer to prepare a sealing material.

With respect to each of the sealing martials of Examples 8-5 to 8—8 and Comparative Examples 8-3 and 8-4, the adhesive strength and the releasing strength of the release liner were measured by the same methods as described above.

The results are as shown in Table 8-2 below.

TABLE 8-2

|  | Adhesive Strength (g/20 mm width) | Releasing Strength (g/50 min width) |
| --- | --- | --- |
| Example 8-5 | 1,350 | 20 |
| Example 8-6 | 1,000 | 30 |
| Example 8-7 | 1,000 | 50 |

TABLE 8-2-continued

|  | Adhesive Strength (g/20 mm width) | Releasing Strength (g/50 min width) |
| --- | --- | --- |
| Example 8-8 | 1,200 | 20 |
| C. Example 8-3 | 1,000 | 30 |
| C. Example 8-4 | 1,000 | 20 |

C. Example: Comparative Example

As is clear from the results of Table 8-2 above, it can be seen that each of the sealing materials of Examples 8-5 to 8—8 shows, in spite of using a release liner not subjected to a silicone release coating, shows a small releasing strength giving no hindrance to the releasing work as the case of the sealing material using the release liner subjected to a silicone release coating (Comparative Example 8-3) and also has a large adhesive strength desired for practical use.

Also, because each of the sealing materials of Examples 8-5 to 8—8 is different from the sealing material of Comparative Example 8-3, does not contain a silicone compound in the release liner, and does not contain a silicone compound in the sealing base material and the layer of the pressure-sensitive adhesive composition, when the sealing material is used as a connecting material for HDD, a siloxane gas does not generate in the inside of HDD and there are no possibilities of causing the corrosion of the inside of HDD, an erroneous action, a head crush, etc. Furthermore, because a material having a high moisture proof effect is used as the sealing base material, the moisture proof effect is far high as compared with the sealing material of Comparative Example 8-4, the sealing function based on the moisture proofing effect can be more effectively exhibited together with the above-described good adhesive strength.

Example 9-1

In a four-neck separable flask equipped with a stirrer, a thermometer, and a water separator were placed 250.0 g (hydroxy group: 0.25 equivalent) of polycarbonate diol (PLACCEL CD220PL, trade name, made by DAICEL CHEMICAL INDUSTRIES, LTD.; hydroxy group value 56.1 KOH mg/g), 25.28 g (acid group: 0.25 equivalent) of sebacic acid, and 62 mg (0.1 equivalent %) of DBTO as a catalyst, the temperature of the mixture was raised to 180° C. while stirring in the presence of a small amount of toluene as a reaction water discharging solvent, and the mixture was maintained at the temperature. After a while, the outflow and separation of water were observed and the reaction began to proceed. By continuing the reaction for about 25 hours, a polyester having a weight average molecular weight of 72,000 was obtained.

After diluting the polyester with toluene to a solid component concentration of 50% by weight, 1 part (solid components) of the hexamethylene diisocyanate trimer addition product of trimethylolpropane (Coronate HL, trade name, made by Nippon Polyurethane Industry Co., Ltd.) per 100 parts (solid component) of the polyester was added thereto as a crosslinking agent to provide a pressure-sensitive adhesive composition. The composition was coated on one surface of a PET film of 38 μm in thickness as an insulating base material by an applicator, followed by drying at 130° C. for 5 minutes, to form a pressure-sensitive adhesive layer of 50 μm in thickness. Thus, a reinforcing sheet was prepared.

Example 9-2

A reinforcing sheet was prepared in the same manner as in Example 9-1 except that the thickness of the adhesive layer was changed to 20 μm.

Example 9-3

By following the same procedure as Example 9-1 except that the used amount of the hexamethylene diisocyanate trimer addition product of trimethylolpropane (Coronate HL, made by Nippon Polyurethane Industry Co., Ltd.) as the crosslinking agent was changed to 1.5 parts, a pressure-sensitive composition was prepared, and a reinforcing sheet having the layer of the pressure-sensitive adhesive composition having a thickness of 50 μm was prepared.

Example 9-4

A reinforcing sheet was prepared in the same manner as in Example 9-3 except that the thickness of the pressure-sensitive adhesive layer was changed to 20 μm.

Comparative Example 9-1

After diluting a thermoplastic copolymerized polyester resin (Vylon #300, trade name, made by TOYOBO CO., LTD.) with toluene to a solid component concentration of 40% by weight, 2 parts (solid components) of the hexamethylene diisocyanate trimer addition product of trimethylolpropane (Coronate HL, trade name, made by Nippon Polyuethane Industry Co., Ltd.) was added thereto per 100 parts (solid components) of the polyester as a crosslinking agent to provide a pressure-sensitive adhesive composition. Then, using the composition, a reinforcing sheet having the adhesive layer of 50 μm in thickness was prepared in the same manner as in Example 9-1.

Comparative Example 9-2

A reinforcing sheet was prepared in the same manner as in Comparative Example 9-1 except that the thickness of the adhesive layer was changed to 20 μm.

With respect to each of the reinforcing sheets obtained in Examples 9-1 to 9-4 and Comparative Examples 9-1 and 9-2, the measurement of the solvent-insoluble component of the pressure-sensitive adhesive layer and the measurement of the adhesive strengths (the adhesive strength to an insulating layer (polyester film) constituting a tape electric wire and the adhesive strength to a tin-plated electrically conductive wire) at normal temperature (23° C.) and at a low temperature (0° C.) were measured by the following methods.

The measurement of the solvent-insoluble component was carried out by the same manner as in "Measurement of Solvent-Insoluble Component" in Example 2-4.

Measurement of Adhesive Strength

The reinforcing sheet was stuck to a polyester film (insulating layer) and a tin-placed conductive wire as adherends each under the conditions of 150° C., 1 kg/cm², and 2 seconds in an atmosphere of normal temperature (23° C.) or a low temperature (0° C.), and the 180 degree peel adhesive strength was measured under the condition of the releasing rate of 100 mm/minute.

TABLE 9-1

| | Solvent-Insoluble Component (wt. %) | Adhesive strength (kg/cm) | | | |
|---|---|---|---|---|---|
| | | Polyester Film | | Tin-Plated Wire | |
| | | 23° C. | 0° C. | 23° C. | 0° C. |
| Ex 9-1 | 17 | 1.6 | 1.0 | 100 | 110 |
| Ex 9-2 | 18 | 1.3 | 1.6 | 70 | 90 |
| Ex 9-3 | 55 | 1.7 | 2.2 | 140 | 140 |
| Ex 9-4 | 51 | 1.4 | 1.0 | 110 | 110 |
| CE 9-1 | 35 | 1.5 | 0.2 | 150 | 30 |
| CE 9-2 | 37 | 1.4 | 0.1 | 130 | 10 |

Ex: Example
CE: Comparative Example

As is clear from the results shown in Table 9-1 above, it can be seen that each of the reinforcing sheets of Examples 9-1 to 9-4 of the present invention shows a very excellent adhesive fore to the insulating layer (polyester film) and the tin-placed electrically conductive wire constituting a tape electric wire under both the normal temperature atmosphere and the low-temperature atmosphere.

Example 10-1

In a reaction vessel equipped with a thermometer, a stirrer, and a water separator were placed 100 parts of polycarbonate diol (PLACCEL CD220PL, trade name, made by DAICEL CHEMICAL INDUSTRIES, LTD., hydroxy group value 56.1 KOH mg/g), 10.1 parts of sebacic acid, and 0.025 part of DBTO, and the temperature of the mixture was raised to 180° C. with stirring in the presence of toluene as a reaction water discharging solvent. After a while, the outflow and the separation of water were observed. By continuing the reaction for about 24 hours, a solution of a polyester series polymer having a weight average molecular weight of 60,000 was obtained.

To the solution of the polyester series polymer were added 30 parts of a terpenephenol resin having a softening point of 115° C. and 2 parts of the hexamethylene diisocyanate addition product of trimethylolpropane per 100 parts of the solid components thereof, followed by mixing, to provide a pressure-sensitive adhesive solution. Then, the pressure-sensitive adhesive solution was coated on one surface of a polyester film of 188 μm in thickness at a dry thickness of 50 μm, followed by drying at 120° C. for 2 minutes, to prepare a reinforcing sheet.

Example 10-2

By following the same procedure as Example 10-1 except that 20 parts of a rosinphenol resin having a softening point of 145° C. was used in place of 30 parts of the terpenehenol resin having a softening point of 115° C., a pressure-sensitive adhesive solution was prepared, and using the solution, a reinforcing sheet was prepared.

Example 10-3

By following the same procedure as Example 10-1 except that 50 parts of a coumarone-indene resin having a softening point of 120° C. was used in place of 30 parts of the terpenehenol resin having a softening point of 115° C., a pressure-sensitive adhesive solution was prepared and using the solution, a reinforcing sheet was prepared.

Comparative Example 10-1

To the solution of the polyester series polymer obtained in Example 10-1 was added 2 parts of the tolylene diisocyanate addition product of trimethylolpropane per 100 parts of the solid components thereof, followed by mixing, to provide an adhesive solution. Then, using the adhesive solution, a reinforcing sheet was prepared in the same manner as in Example 1.

Comparative Example 10-2

By following the same procedure as in Example 10-1 except that 30 parts by weight of a terpenehenol resin having a softening point of 50° C. was used in place of 30 parts of the terpenehenol resin having a softening point of 115° C., an adhesive solution was prepared, and using the solution, a reinforcing sheet was prepared.

Comparative Example 10-3

In a reaction vessel equipped with a condenser, a nitrogen introducing tube, a thermometer, and a stirrer were placed 50 parts of ethyl acetate and 50 parts of toluene as solvents, 50 parts of 2-ethylhexyl acrylate, 45 parts of n-butyl acrylate, 4.9 parts of acrylic acid, 0.1 part of 2-hydroxyethyl acrylate, and 0.1 part of 2,2'-azobisisobutyronitrile, the polymerization was carried out in a nitrogen gas stream to provide a solution of an acrylic polymer having a weight average molecular weight of 700,000.

To the solution of the acrylic polymer were added 30 parts of a terpenephenol resin having a softening point of 115° C. and 2 parts of the hexamethylene diisocyanate addition product of trimethylolpropane per 100 parts of the solid components thereof, followed by mixing, to provide a pressure-sensitive adhesive solution. Then, using the solution, a reinforcing sheet was prepared in the same manner as in Example 10-1.

About each of the reinforcing sheets prepared in Examples 10-1 to 10-3 and Comparative Examples 10-1 to 10-3, the adhesive strengths to a tin-plated electrically conductive wire and an insulating layer (polyester film) for constituting a tape electric wire in an atmosphere of 0, 25 or 80° C. were measured as follows. The results are as shown in Table 10-1 below.

Measurement of Adhesive Strength to Tin-Plated Conductive Wire

On the pressure-sensitive adhesive layer of the reinforcing sheet of 50 mm×200 mm were placed 6 tine-plated spright angle conductive wires (each of 0.1 mm×0.8 mm×250 mm) and after heat-press adhering under the conditions of 160° C., 5 kg/cm², and one minute, the strength required for releasing one conductive wire was measured. The measurement was carried out in an atmosphere of 0° C., 25° C. (65% RH) or 80° C. under the conditions of a releasing rate of 100 mm/minute and a releasing angle of 180 degree.

Measurement of Adhesive Strength to Insulating Layer (Polyester Film)

On the pressure-sensitive adhesive layer of the reinforcing sheet of 50 mm×200 mm was placed one sheet of a polyester film of 0.1 mm×70 mm×250 mm, after heat-press adhering under the conditions of 160° C., 5 kg/cm², and one minute, the laminate was cut into a width of 1 cm, and the strength required to release the polyester film of 1 cm in width was measured. The measurement was carried out in an atmosphere of 0° C., 25° C. (65% RH), or 80° C., under the conditions of the releasing rate of 100 mm/minute and the releasing angle of 180 degree.

TABLE 10-1

|  | Tin-Plated Wire Adhesive strength (g/0.8 mm) | | | Polyester Film Adhesive strength (kg/cm) | | |
| --- | --- | --- | --- | --- | --- | --- |
|  | 0° C. | 25° C. | 80° C. | 0° C. | 25° C. | 80° C. |
| Ex 10-1 | 100 | 130 | 90 | 1.0 | 1.5 | 0.8 |
| Ex 10-2 | 90 | 140 | 100 | 0.9 | 1.4 | 1.0 |
| Ex 10-3 | 140 | 140 | 80 | 0.9 | 1.3 | 0.9 |
| CE 10-1 | 70 | 120 | 30 | 0.4 | 1.0 | 0.4 |
| CE 10-2 | 70 | 100 | 20 | 0.4 | 1.0 | 0.3 |
| CE 10-3 | 30 | 100 | 80 | 0.2 | 0.8 | 0.5 |

Ex: Example
CE: Comparative Example

It can be seen from the results of Table 10-1 above that each of the reinforcing sheets of Examples 10-1 to 10-3 of the present invention shows excellent adhesive strength to the insulating layer (polyester film) and the electrically conductive wires (tin-placed conductive wires) constituting a tape electric wire at each atmosphere of a low-temperate (0° C.), normal temperature (25° C.) or a high temperature (80° C.).

Example 11-1

A polyethylene (viscosity average molecular weight 300,000) containing 0.4 part of an antioxidant was extrusion-laminated on a glassine paper having a thickness of 50 μm and a basic weight of 80 g at a thickness of 20 μm to provide a tape base material.

The pressure-sensitive adhesive composition obtained in Example 1—1 was uniformly coated on the back surface of the above-described tape base material by a doctor blade method, followed by drying, to form a pressure-sensitive adhesive layer of 20 μm in thickness, whereby a pressure-sensitive adhesive tape for printing was obtained.

Furthermore, to 100 parts of a polyethylene having a viscosity average molecular weight of 8,000 was added 100 parts of carbon, followed by uniformly mixing at about 200° C., and the uniform dispersion was uniformly coated on a polyethylene terephthalate film of 6 μm in thickness by a gravure coating machine for hot melt to provide a pattern-forming ink ribbon having coating of 0.8 μm in thickness.

Using the pressure-sensitive adhesive tape for printing and the ink ribbon, printing was carried out by a heat-transfer printer.

Example 11-2

Printing was carried out in the same manner as in Example 11-1 except for using a base material film of 100 μm in thickness, obtained by uniformly kneading 20 parts of titanium white with a polyethylene (viscosity average molecular weight 500,000) containing 0.2 part of an antioxidant and inflation molding the kneaded mixture, as the tape base material.

Example 11-3

The pressure-sensitive adhesive composition obtained in Example 1—1 was uniformly coated on a polyethylene film having a viscosity average molecular weight of 500,000 and a thickness of 5 μm by a doctor blade method, followed by drying, to form a pressure-sensitive adhesive layer of 3 μm in thickness. A generally commercially available heat-sensitive coloring paper was laminated onto the pressure-sensitive adhesive tape to provide a base material layer of a printing pressure-sensitive adhesive tape. With respect to the other portions, the same procedure as in Example 11-1 was followed to prepare a pressure-sensitive adhesive layer. Also, the formation of the printing pattern was carried out by a thermal printer.

Evaluation Test

The printing tapes obtained in Examples 11-1 to 11-3 were evaluated in terms of the tape re-winding property, the running property by a heat-transfer printer, the printability, and the handling properties as label. The results showed that all cases were good.

INDUSTRIAL APPLICABILITY

As described above, the present invention can provide a pressure-sensitive adhesive composition and the pressure-sensitive adhesive sheets thereof, which have a large adhesive strength in spite of high elasticity and tack free, can exhibit both the good adhesive workability and the good adhesive property, are excellent in the heat resistance, and also are excellent in properties of retaining and fixing articles.

In particular, by using the polymer having the polycarbonate structure as the base polymer and subjecting the polymer to a crosslinking treatment with a crosslinking agent, etc., the above-described pressure-sensitive adhesive composition and pressure-sensitive adhesive sheets thereof greatly excellent in the characteristics such as the heat resistance and the durability can be provided and they can be more developed in various fields as pressure-sensitive adhesive products of new construction.

Also, the present invention can provide, by properly crosslinking the polymer having the polycarbonate structure, a pressure-sensitive adhesive composition and a pressure-sensitive adhesive sheet thereof showing an excellent self-adhering property in addition to the characteristics such as the heat resistance and the durability.

Also, in the present invention, by using the specific polymer having the polycarbonate structure as the main component and crosslinking the polymer to a specific level, a pressure-sensitive adhesive composition not substantially showing tack but has the excellent self-adhesive strength and being excellent in the removability and a pressure-sensitive adhesive sheet thereof can be provided.

Furthermore, by using an acrylic polymer having a glass transition point of −10° C. or lower together with the polymer having the polycarbonate structure, a pressure-sensitive adhesive composition showing very good adhesive characteristics to various adherends and being excellent in the creep characteristics and the long-term durability and a pressure-sensitive adhesive tape thereof can be provided. Also, similarly, a pressure-sensitive adhesive composition satisfying the creep resistance and the adhesive property in a high temperature region and being excellent in the shock resistance at a low temperature and a pressure-sensitive sheets thereof, can be provided by using a resin having a softening point of 80° C. or higher together with the polymer described above.

Moreover, in the present invention, by using a release liner made up of a polyethylene film, a polypropylene film, etc., which is not subjected to a silicone release coating to the layer of the pressure-sensitive adhesive composition of the above-described construction containing the polymer having the polycarbonate structure, the pressure-sensitive adhesive sheets having a good releasing property without containing a silicone and exhibiting a large adhesive strength can be provided. The products can be very advantageously used as pressure-sensitive adhesive sheets suitably used for computer instruments which are liable to cause problems in the presence of a silicone.

Also, in the present invention, by forming the layer of the pressure-sensitive adhesive composition containing the polymer having the polycarbonate structure on one surface of a base material and constituting at least the back side of the base material with a polyolefin such as polyethylene, polypropylene, etc., a pressure-sensitive adhesive sheet which can be wound in roll forms without inserting a release liner can be provided. This product can be advantageously used for computer instruments, etc., which are liable to cause problems by the existence of silicone, as a pressure-sensitive sheet which does not have a release liner, do not need to apply a release coating to the back side of the base material with a silicone compound, and contain substantially no silicone compound.

Also, in the constitution in which the layer of the specific pressure-sensitive adhesive composition is formed on a sealing base material according to the present invention, a release liner which is not subjected to a silicone release coating can be used, and it is unnecessary to subject the back side of the sealing base material to a silicone release coating. Thus, a sealing material having a good releasing property to a release liner and the back surface of itself, showing a large adhesive strength, and being excellent in the original sealing function can be provided as a sealing material containing substantially no silicone compound and suitable for HDD, etc.

Furthermore, in the present invention, by using the specific polyester having the polycarbonate structure as the base polymer for the pressure-sensitive adhesive layer which is formed on one surface of an insulating base material, the reinforcing sheet excellent in the adhesive property with a tape electric wire (insulating layer and conductive wires) at not only a normal temperature but also a low-temperature environment of about 0° C. or less can be provided and by using the specific resin together with the specific polyester, the reinforcing sheet excellent in the adhesive property to the tape electric wire not only in a normal temperature atmosphere but also in a low-temperature atmosphere and a high-temperature atmosphere can be provided.

Also, in the present invention, by using the specific pressure-sensitive adhesive sheets as pressure-sensitive adhesive sheets for printing, the printing pressure-sensitive adhesive sheets excellent in the tape re-winding property, the running property in a heat-transfer printer, the printability, and the handling properties as label can be provided.

What is claimed is:

1. A pressure-sensitive adhesive composition, comprising a polymer having a polycarbonate structure having a repeating unit represented by the following formula:

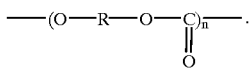

wherein R represents a straight chain or branched hydrocarbon group having from 2 to 20 carbon atoms;
wherein said polymer is a polyester having a weight average molecular weight of at least 10,000 synthesized from diol components indispensably containing polycarbonate diol and dicarboxylic acid components indispensably containing a dicarboxylic acid having an aliphatic hydrocarbon group of from 2 to 20 carbon atoms or an alicyclic hydrocarbon group in its molecular structure;

and the storage elastic modulus (G') at room temperature is at least $2 \times 10^6$ dyne/cm$^2$ and at $-30°$ C. is $3 \times 10^7$ dyne/cm$^2$ or lower and the adhesive strength at room temperature is at least 1 kg/20 mm width.

2. A pressure-sensitive adhesive composition of claim 1, wherein the storage elastic modulus at 80° C. is $1 \times 10^6$ dyne/cm$^2$ or higher.

3. A pressure-sensitive adhesive composition of claim 1, wherein the solvent-insoluble component of the polymer is from 1 to 30% by weight and the self-adhesive strength is at least 2.0 kg/20 mm width.

4. A pressure-sensitive adhesive composition of claim 1, wherein the self-adhesive strength is at least 100 g/20 mm width and the adhesive strength is not higher than 2,000 g/20 mm width.

5. A pressure-sensitive adhesive composition of claim 4, wherein the polymer having a polycarbonate structure is crosslinked and the solvent-insoluble component is from 60 to 95% by weight.

6. A pressure sensitive adhesive composition of claim 1, wherein said composition contains an acrylic polymer having a glass transition temperature of $-10°$ C. or lower in an amount of from 10 to 90% by weight of the sum total of the acrylic polymer and the polymer having the polycarbonate structure.

7. A pressure sensitive adhesive composition of claim 1, wherein said composition contains a resin having a softening point of at least 80° C. in an amount of from 10 to 50% by weight of the sum total of the resin and the polymer having the polycarbonate structure.

* * * * *